US010739718B2

(12) United States Patent
Suzuki

(10) Patent No.: US 10,739,718 B2
(45) Date of Patent: Aug. 11, 2020

(54) IMAGE FORMING APPARATUS

(71) Applicant: CANON KABUSHIKI KAISHA, Tokyo (JP)

(72) Inventor: Takako Suzuki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/530,442

(22) Filed: Aug. 2, 2019

(65) Prior Publication Data

US 2020/0050138 A1 Feb. 13, 2020

(30) Foreign Application Priority Data

Aug. 9, 2018 (JP) ................................ 2018-150556

(51) Int. Cl.
*G02B 26/10* (2006.01)
*G03G 15/00* (2006.01)
*G03G 21/00* (2006.01)

(52) U.S. Cl.
CPC ................................ *G03G 21/0005* (2013.01)

(58) Field of Classification Search
CPC ................................................. G03G 21/0005
See application file for complete search history.

(56) References Cited

U.S. PATENT DOCUMENTS

2014/0112676 A1* 4/2014 Mori ................ G03G 15/04045 399/49
2019/0235408 A1* 8/2019 Kawamoto ........ G03G 15/0225

FOREIGN PATENT DOCUMENTS

JP 2016-31467 A 3/2016

* cited by examiner

*Primary Examiner* — David M. Gray
*Assistant Examiner* — Michael A Harrison
(74) *Attorney, Agent, or Firm* — Canon U.S.A., Inc. IP Division

(57) ABSTRACT

In a case where a total value of the number of images to be formed specified by an input job and a count value of a counter before the number of images to be formed according to the job is counted is included in a predetermined range including a predetermined number of images, a cleaning mechanism is caused to operate after formation of images according to the job is completed, and a cleaning process is executed.

28 Claims, 11 Drawing Sheets

IMAGE FORMING APPARATUS

BACKGROUND OF THE INVENTION

Field of the Invention

The present disclosure relates to an image forming apparatus, such as an electrophotographic copying machine or a laser beam printer, that forms an image on a recording medium using an electrophotographic method.

Description of the Related Art

Conventionally, in an image forming apparatus employing an electrophotographic method, an optical scanning device is provided that irradiates the charged surface of a photosensitive member with laser light, thereby forming an electrostatic latent image. The optical scanning device includes optical system components such as a light source and a mirror, a housing that covers the optical system components, and an opening portion that enables light to be emitted from the light source to outside the housing. Then, to prevent a foreign substance such as toner or dust from entering the housing, the opening portion is closed by a transmission member that transmits light.

If a foreign substance such as toner or dust exists on the transmission member, the light emitted from the opening portion may be blocked by the foreign substance, whereby the optical characteristics may change, and result in deterioration of the quality of an image to be formed.

In contrast, Japanese Patent Application Laid-Open No. 2016-31467 discusses a configuration in which a cleaning process for removing a foreign substance on the transmission member using the cleaning member is performed by moving a cleaning member in contact with a transmission member. Further, Japanese Patent Application Laid-Open No. 2016-31467 discusses a configuration in which such a cleaning process is periodically executed every time images are formed on about 10000 sheets, for example.

If, however, a user is executing an image forming job when the number of images based on which the cleaning process is periodically executed is reached, the cleaning process is performed by suspending the image forming job. In this case, the user is kept waiting for the time taken for the cleaning process. This may impair usability.

SUMMARY OF THE INVENTION

The present disclosure is directed to providing an image forming apparatus that does not impair usability even in a case where a cleaning process is periodically executed.

According to an aspect of the present disclosure, an image forming apparatus includes an image forming unit including, a photosensitive member, and an optical scanning device having a transmission member that allows laser light that scans the photosensitive member to pass therethrough to outside the optical scanning device, wherein the image forming unit is configured to develop, using toner, an electrostatic latent image formed on the photosensitive member by being scanned by the laser light and transferring a toner image obtained by developing the electrostatic latent image onto a recording medium, thereby forming an image on the recording medium, a cleaning mechanism configured to clean the transmission member, a counter configured to count the number of formed images indicating images formed on recording media by the image forming unit, and a control unit configured to control the cleaning mechanism to clean the transmission member when the number of formed images counted by the counter reaches a predetermined number of images or a predetermined range including the predetermined number of images, wherein, in a case where a total value of the number of images to be formed specified by an input job and a count value of the counter before the number of images to be formed according to the job is counted is included in the predetermined range including the predetermined number of images, the control unit causes the cleaning mechanism to operate after formation of images according to the job is completed.

Further features of the present disclosure will become apparent from the following description of exemplary embodiments with reference to the attached drawings.

DESCRIPTION OF THE EMBODIMENTS

Embodiments for carrying out the present disclosure will be described below with reference to the drawings. The dimensions, the materials, the shapes, and the relative arrangement of the components described below do not limit the scope of the disclosure to them only, unless specifically stated otherwise.

Figure 1:
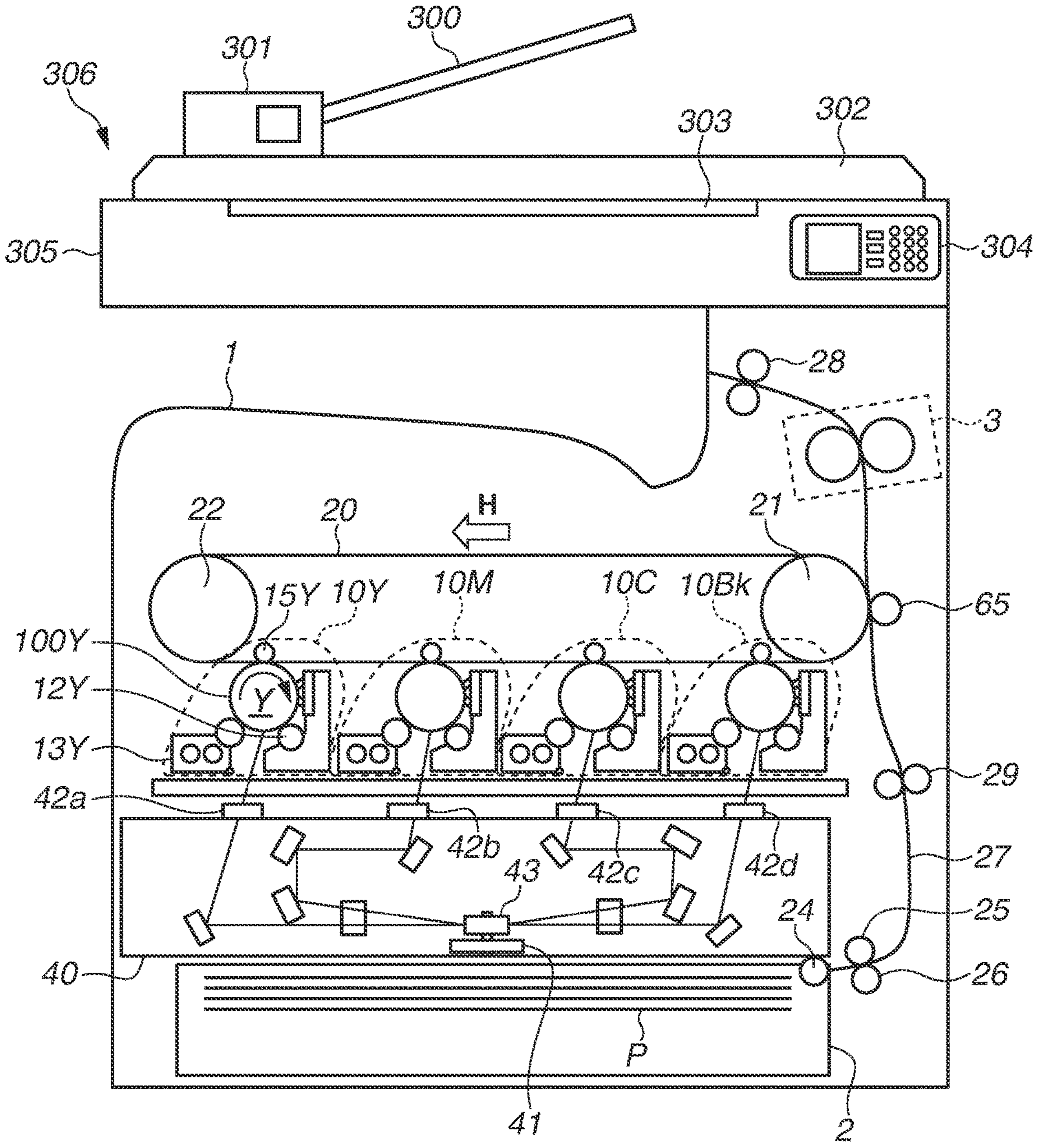
FIG. 1 is a schematic cross-sectional view of an image forming apparatus.

FIG. 1 is a schematic cross-sectional view of an image forming apparatus 1 according to a first exemplary embodiment. As illustrated in FIG. 1, the image forming apparatus 1 according to the present exemplary embodiment is a tandem color laser beam printer including four image formation units 10Y, 10M, 10C, and 10Bk that form toner images of yellow (Y), magenta (M), cyan (C), and black (Bk) colors, respectively.

Further, the image forming apparatus 1 according to the present exemplary embodiment includes a reader unit 306 above the main body of the apparatus. The reader unit 306 includes a document conveying device 301 that automatically conveys a document, a document reading device 305 that reads an image on the conveyed document, and a document discharge tray 302 onto which the document is discharged.

The document conveying device 301 includes a document sheet feeding tray 300 on which documents are set. The document conveying device 301 conveys the documents placed on the document sheet feeding tray 300 one by one to a document reading position on glass 303. Each document conveyed onto the glass 303 is read by a scanner (not illustrated) such as a charge-coupled device (CCD) sensor or a contact image sensor (CIS) provided inside the document reading device 305. Then, the document conveying device 301 further conveys the document and discharges the document onto the document discharge tray 302.

The document conveying device 301 is openable and closable relative to the document reading device 305. By opening the document conveying device 301, an operator can place a document on the glass 303.

Then, the scanner irradiates the document conveyed onto the glass 303 by the document conveying device 301 or the document placed on the glass 303 with light from a light source and converts the light reflected from the document and received by a light-receiving sensor into electric signals. The electric signals having red (r), green (g), and blue (b) components obtained by this conversion are output to a control unit such as a central processing unit (CPU) 601.

Further, as illustrated in FIG. 1, the image forming apparatus 1 according to the present exemplary embodiment includes an operation unit 304. The operation unit 304 includes a display that displays setting information regarding printing conditions to the operator such as a user or a serviceman.

The display can display software keys that are operated by the operator contacting the software keys with their finger. Consequently, the operator can input information indicating one-sided printing or two-sided printing through an operation panel.

The operation unit 304 includes a start key that is pressed to start an age forming operation and a stop key that is pressed to suspend an image forming operation. A numeric keypad is keys that are pressed to set the number of images to be formed. In the image forming apparatus 1 according to the present exemplary embodiment, the start key, the stop key, and the numeric keypad are provided as hardware keys in the operation unit 304, but may be displayed as software keys on the display. Various types of data input through the operation unit 304 are stored in a random-access memory (RAM) 603 via the CPU 601.

The image forming apparatus 1 includes an intermediate transfer belt 20 onto which toner images formed by the image formation units 10Y, 10M, 10C, and 10Bk are transferred. Then, a configuration is employed in which the toner images superimposed on the intermediate transfer belt 20 by the respective image formation units 10 are transferred onto a sheet P as a recording medium, thereby forming a color image on the sheet P (the recording medium). The image formation units 10Y, 10M, 10C, and 10Bk are configured approximately similarly to each other, except that the colors of toners used in the image formation units 10Y, 10M, 10C, and 10Bk are different from each other. Each image formation unit 10 is described below using the image formation unit 10Y as an example, and the image formation units 10M, 10C, and 10Bk are not redundantly described. In the present disclosure, examples of the recording medium not only include paper for use in general printing, but also broadly include sheet-like recording media such as cloth, plastic, and film.

The image formation unit 10 includes a photosensitive member 100, a charging roller 12 that charges the photosensitive member 100 to a uniform background potential, a developing device 13 as a developing unit that develops an electrostatic latent image formed on the photosensitive member 100 by an optical scanning device 40, thereby forming a toner image, and a primary transfer roller 15 that transfers the formed toner image onto the intermediate transfer belt 20. In this case, the primary transfer roller 15 forms a primary transfer portion with the photosensitive member 100 via the intermediate transfer belt 20. A predetermined transfer voltage is applied to the primary transfer roller 15, whereby the primary transfer roller 15 transfers the toner image formed on the photosensitive member 100 onto the intermediate transfer belt 20.

The intermediate transfer belt 20 is formed endlessly and hung around a first belt conveying roller 21 and a second belt conveying roller 22. While the intermediate transfer belt 20 rotationally moves in the direction of an arrow H, the toner images formed by the image formation units 10 are transferred onto the intermediate transfer belt 20. In this case, the four image formation units 10Y, 10M, 10C, and 10Bk are placed in parallel vertically below the intermediate transfer belt 20, and toner images formed on the photosensitive members 100 according to pieces of image information regarding the respective colors are transferred onto the intermediate transfer belt 20. An image forming process of each color by the image formation unit 10 is performed at the timing when the toner image is superimposed on the toner image on the upstream side primarily transferred onto the intermediate transfer belt 20. As a result, the toner images of the four colors are formed in a superimposed manner on the intermediate transfer belt 20.

Further, the first belt conveying roller 21 and a secondary transfer roller 65 are in pressure contact with each other across the intermediate transfer belt 20 and form a secondary transfer portion between the first belt conveying roller 21 and the secondary transfer roller 65 through the intermediate transfer belt 20. A sheet P is inserted into the secondary transfer portion, whereby the toner images are transferred from the intermediate transfer belt 20 onto the sheet P. Transfer residual toner remaining on the surface of the intermediate transfer belt 20 is collected by a cleaning device (not illustrated).

The image formation units 10 of the respective colors are placed such that in the rotational direction of the intermediate transfer belt 20 (the direction of the arrow H), the image formation unit 10Y that forms a yellow toner image, the image formation unit 10M that forms a magenta toner image, the image formation unit 10C that forms a cyan toner image, and the image formation unit 10Bk that forms a black toner image are arranged in order from the upstream side relative to the secondary transfer unit.

Further, vertically below the image formation units 10, the optical scanning device 40 that scans beams of laser light on the photosensitive members 100 is provided, thereby forming electrostatic latent images according to pieces of image information regarding images to be formed on the photosensitive members 100. The image formation units 10 and the optical scanning device 40 are examples of an image forming unit.

The optical scanning device 40 includes four semiconductor lasers (not illustrated) that emit beams of laser light modulated according to pieces of image information regarding the respective colors. Further, the optical scanning device 40 includes a motor unit 41 and a rotary polygon mirror 43 that is rotated at a high speed by the motor unit 41, thereby deflecting the beams of laser light emitted from the semiconductor lasers to scan along the rotational axis directions of the photosensitive members 100. The beams of laser light deflected by the rotary polygon mirror 43 are guided by optical members placed inside the optical scanning device 40 and emitted from inside to outside the optical scanning device 40 via transmission members 42*a* to 42*d* that cover opening portions provided in an upper portion of the optical scanning device 40. Then, the beams of laser light expose the photosensitive members 100.

Meanwhile, sheets P are stored in a feed cassette 2 placed in a lower portion of the image forming apparatus 1. Then, the sheets P are fed by a pickup roller 24 to a separation nip portion formed by a feed roller 25 and a retard roller 26. In this case, drive is transmitted to the retard roller 26 so that in a case where a plurality of sheets P is fed by the pickup roller 24, the retard roller 26 rotates backward. The sheets P are conveyed downstream one by one, thereby preventing multi-feed of the sheets P. Each sheet P conveyed by the feed roller 25 and the retard roller 26 is conveyed to a conveying path 27 that extends approximately vertically along a right side surface of the image forming apparatus 1.

Then, the sheet P is conveyed from the lower side to the upper side in the vertical direction of the image forming apparatus 1 through the conveying path 27 and conveyed to registration rollers 29. The registration rollers 29 temporarily stop the conveyed sheet P and correct the skew of the sheet P. Then, the registration rollers 29 convey the sheet P to the secondary transfer portion according to the timing when toner images formed on the intermediate transfer belt 20 are conveyed to the secondary transfer portion. Then, the sheet P onto which the toner images are transferred by the secondary transfer portion is conveyed to a fixing device 3 and heated and pressurized by the fixing device 3, whereby the toner images are fixed to the sheet P. Then, the sheet P to which the toner images are fixed is discharged by discharge rollers 28 to a discharge tray provided outside the image forming apparatus 1 and in an upper portion of the main body of the image forming apparatus 1.

As described above, if the image forming apparatus 1 is configured such that the image formation units 10 are provided above the optical scanning device 40 inside the main body of the image forming apparatus 1, there is a case where a foreign substance such as toner, paper dust, or dust falls on the transmission members 42*a* to 42*d* provided in the upper portion of the optical scanning device 40 as a result of an image forming operation. In this case, beams of laser light to be emitted to the photosensitive members 100 through the transmission members 42*a* to 42*d* are blocked by the foreign substance. Thus, there is a case where the foreign substance changes the optical characteristics, thereby reducing the quality of an image.

Figure 2:
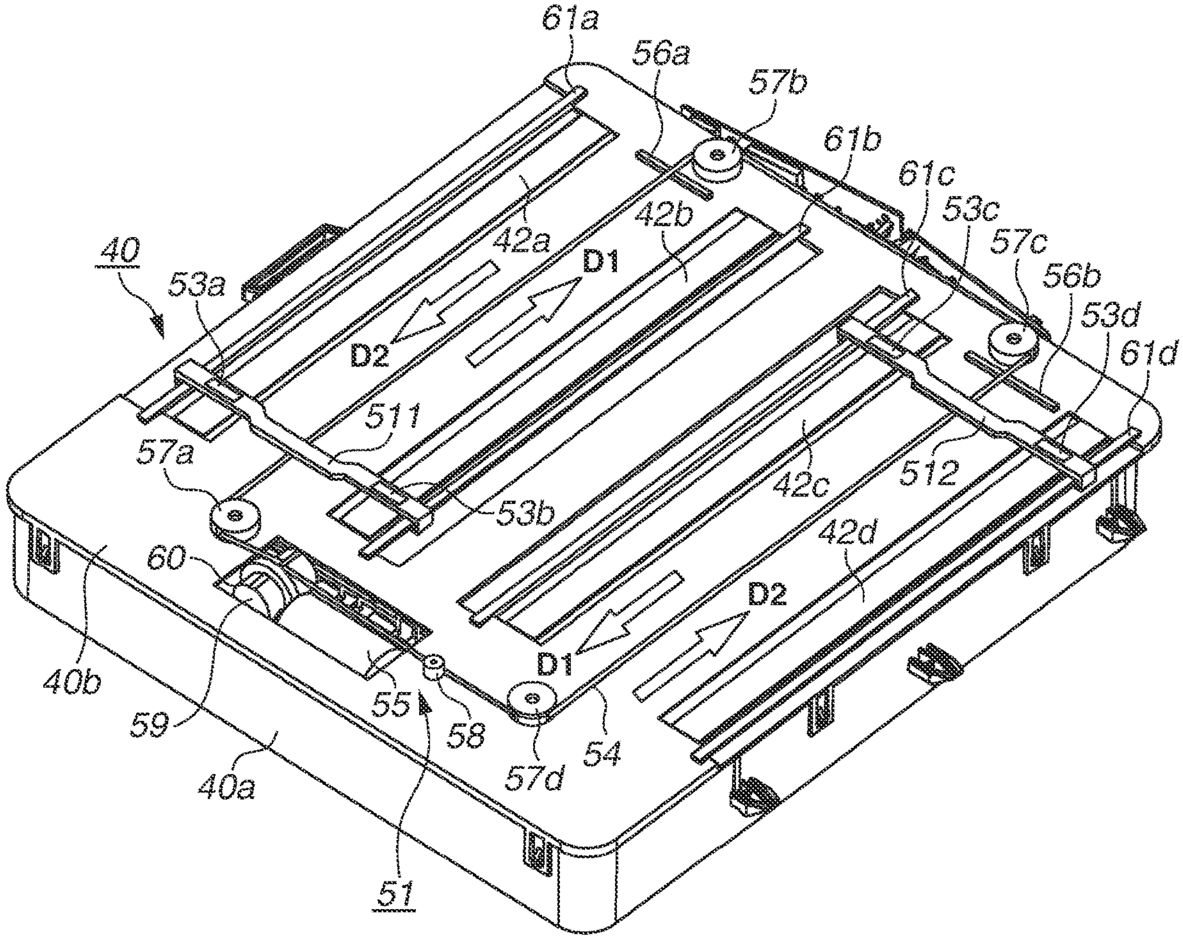
FIG. 2 is a perspective view of an optical scanning device.
Figure 3:
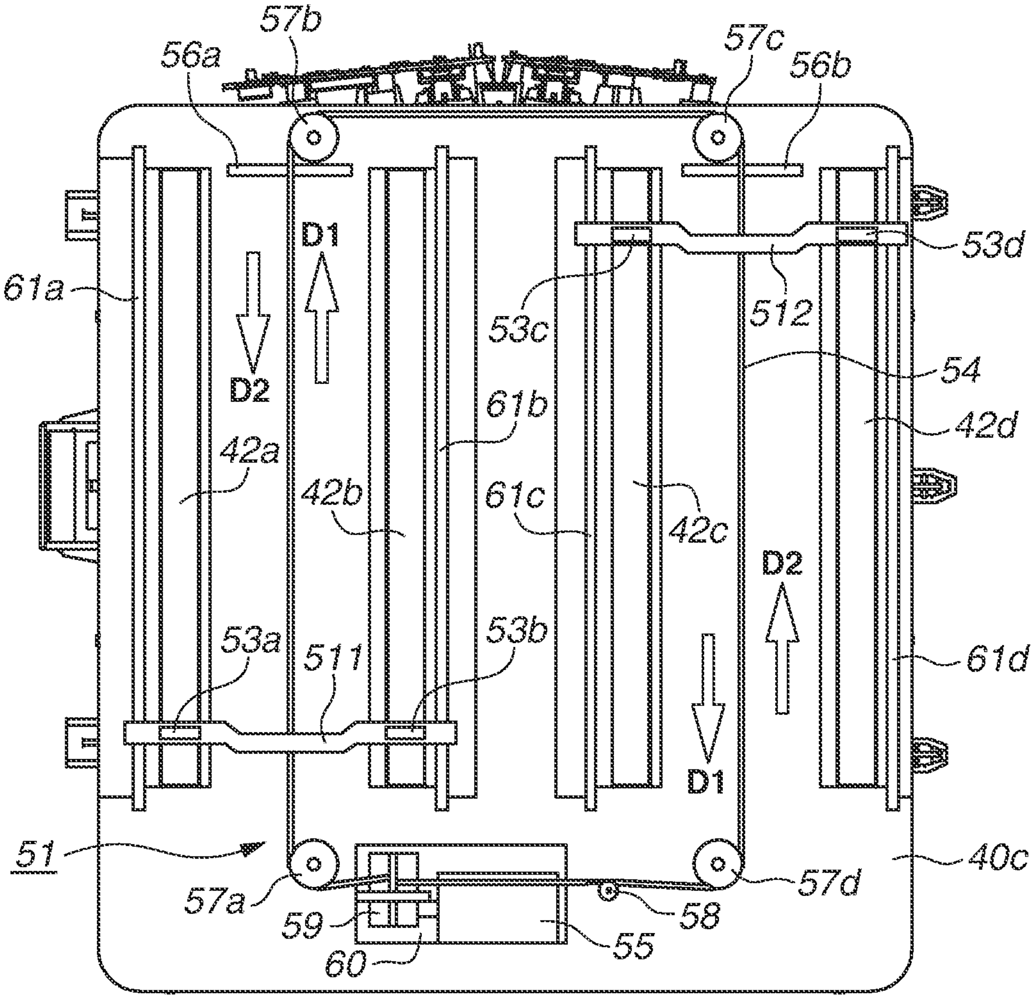
FIG. 3 is a top view of the optical scanning device.

In the present exemplary embodiment, the optical scanning device 40 includes a cleaning mechanism 51 that cleans the transmission members 42*a* to 42*d*. The optical scanning device 40 and the cleaning mechanism 51 provided in the optical scanning device 40 are described in detail below. FIG. 2 is a perspective view illustrating the entire optical scanning device 40. FIG. 3 is a top view of the optical scanning device 40.

As illustrated in FIGS. 2 and 3, the optical scanning device 40 includes an accommodation portion 40*a* that accommodates the motor unit 41 and the rotary polygon mirror 43 inside the optical scanning device 40, and a cover portion 40*b* that is attached to the accommodation portion 40*a* and covers an upper surface of the accommodation portion 40*a*. The accommodation portion 40*a* and the cover portion 40*b* form a housing of the optical scanning device 40. In the cover portion 40*b*, four opening portions through which beams of laser light pass are provided corresponding to the photosensitive members 100 of the respective colors. Each opening portion has a rectangular shape that is long in the rotational axis direction of the corresponding photosensitive member 100, and the opening portions are formed extending parallel to each other in their longitudinal directions. The opening portions are closed by the transmission members 42*a* to 42*d* that are each formed into a long rectangular shape. Similarly to the opening portions, four transmission members 42*a* to 42*d* are provided and attached to the cover portion 40*b*, extending parallel to each other in their longitudinal directions. The longitudinal directions of the transmission members 42*a* to 42*d* are approximately equal to the scanning directions of beams of laser light emitted from the optical scanning device 40. Further, in the present exemplary embodiment, the longitudinal directions of the transmission members 42*a* to 42*d* are approximately equal to the rotational axis directions of the photosensitive members 100.

The transmission members 42*a* to 42*d* are provided to prevent a foreign substance such as toner, dust, or paper dust from entering the optical scanning device 40. The transmission members 42*a* to 42*d* prevent a deterioration of image quality due to the attachment of a foreign substance to the semiconductor lasers, the mirror, or the rotary polygon mirror 43. The transmission members 42*a* to 42*d* are each formed of a transparent member such as glass, and can emit, to the photosensitive members 100, beams of laser light emitted from the semiconductor lasers in the accommodation portion 40*a*. In the present exemplary embodiment, a configuration is employed in which the sizes of the transmission members 42*a* to 42*d* are set to be larger than those of the openings of the opening portions so that the transmission members 42*a* to 42*d* cover the opening portions in an overlapping manner. Then, portions of the transmission members 42*a* to 42*d* that overlap the opening portions are bonded, thereby fixing the transmission members 42*a* to 42*d* to the cover portion 40*b*.

As described above, a configuration is employed in which the optical scanning device 40 is covered by the cover portion 40*b* and the transmission members 42*a* to 42*d*, whereby a foreign substance such as toner, paper dust, or dust does not enter the optical scanning device 40. Further, the transmission members 42*a* to 42*d* larger than the opening portions are bonded and fixed to the cover portion 40*b*, thereby preventing a foreign substance such as toner, paper dust, or dust that falls from above the optical scanning device 40 from entering the optical scanning device 40 through the gaps between the transmission members 42*a* to 42*d* and the opening portions.

In the present exemplary embodiment, the optical scanning device 40 includes the cleaning mechanism 51 that performs a cleaning process for cleaning a foreign substance fallen on an upper surface of the optical scanning device 40 (upper surfaces of the transmission members 42*a* to 42*d*) from above. The "upper surfaces of the transmission members 42*a* to 42*d*" are surfaces on the outer side relative to the optical scanning device 40 and surfaces on the side to which beams of laser light passing through the transmission members 42*a* to 42*d* are emitted.

The cleaning mechanism 51 is attached on the cover portion 40*b* of the optical scanning device 40 and on the side where the surface of the optical scanning device 40 is opposed to the image formation units 10. The cleaning mechanism 51 includes cleaning members 53*a* to 53*d* that clean the upper surfaces of the transmission members 42*a* to 42*d* (the surface on the outer side of the optical scanning device 40), and a first cleaning holder 511 and a second cleaning holder 512 that move the cleaning members 53*a* to 53*d* on the transmission members 42*a* to 42*d* by holding the cleaning members 53*a* to 53*d*.

Each of the first cleaning holder 511 and the second cleaning holder 512 extends, over two of the transmission members 42 adjacent to each other, in a direction orthogonal to the directions in which the transmission members 42 extend, and includes two of the cleaning members 53. As many cleaning members 53 as the number of the transmission members 42 are provided in the first cleaning holder 511 and the second cleaning holder 512.

That is, the first cleaning holder 511 is placed extending over the transmission members 42*a* and 42*b* and includes the cleaning member 53*a* that cleans the upper surface of the transmission member 42*a*, and the cleaning member 53*b* that cleans the upper surface of the transmission member 42*b*. Further, the second cleaning holder 512 is placed extending over the transmission members 42*c* and 42*d* and includes the cleaning member 53*c* that cleans the upper surface of the transmission member 42*c*, and the cleaning member 53*d* that cleans the upper surface of the transmission member 42*d*.

The cleaning members 53*a* to 53*d* are composed of, for example, silicon rubber or non-woven fabric and move in contact with the upper surfaces of the transmission members 42 in response to the movements of the first cleaning holder 511 and the second cleaning holder 512, and thereby can remove a foreign substance on the transmission members 42. Thus, the cleaning members 53*a* to 53*d* can clean the transmission members 42.

A configuration is employed in which a center portion of the first cleaning holder 511 is joined to a wire 54, and the first cleaning holder 511 holds the cleaning members 53*a* and 53*b* on its respective end sides centered on the wire 54. Further, a configuration is employed in which a center portion of the second cleaning holder 512 is joined to the wire 54, and the second cleaning holder 512 holds the cleaning members 53*c* and 53*d* on its respective end sides centered on the wire 54. Thus, the wire 54 is tightly stretched to pass between the transmission members 42*a* and 42*b* and between the transmission members 42*c* and 42*d*.

Further, the wire 54 is circularly tightly stretched on the cover portion 40*b* by four tight stretching pulleys 57*a* to 57*d* rotatably held by the cover portion 40*b*, a tension adjustment pulley 58, and a wind-up drum 59. Further, the wire 54 is stretched around the tight stretching pulleys 57*a* to 57*d* in the state where the length of the wire 54 is adjusted by the wind-up drum 59 winding up the wire 54 a predetermined number of times when the apparatus is assembled. At this time, the four tight stretching pulleys 57*a* to 57*d* are placed so that as described above, the wire 54 passes between the transmission members 42*a* and 42*b* and between the transmission members 42*c* and 42*d*.

The tension of the wire 54 is adjusted by the tension adjustment pulley 58 provided between the tight stretching pulleys 57*a* and 57*d*. Thus, the wire 54 is placed in the state where the wire 54 is stretched without looseness between the tight stretching pulleys 57, the tension adjustment pulley 58, and the wind-up drum 59. Consequently, by tightly stretching the wire 54, it is possible to smoothly circularly run the wire 54.

In the present exemplary embodiment, a configuration is employed in which the tension adjustment pulley 58 is provided between the tight stretching pulleys 57*a* and 57*d*. The position of the tension adjustment pulley 58, however, is not limited to this position so long as the tension adjustment pulley 58 can adjust the tension of the wire 54 stretched around the tight stretching pulleys 57*a* to 57*d*.

As described above, in the present exemplary embodiment, a configuration is employed in which the cleaning members 53*a* and 53*b* are provided in the first cleaning holder 511, and the cleaning members 53*c* and 53*d* are provided in the second cleaning holder 512. In contrast, in a case where a single cleaning member is held by a single cleaning holder, as many cleaning holders as the number of transmission members need to be included. Thus, the length of a wire tightly stretched and joined to the cleaning holders becomes great. Thus, in the present exemplary embodiment, the number of cleaning holders can be reduced as compared with, and the length of the wire 54 can be smaller than, the configuration in which a single cleaning member is held by a single cleaning holder. Thus, it is possible to clean the upper surfaces of the transmission members 42*a* to 42*d* with a simpler configuration.

Further, the wind-up drum 59 is configured to be rotatable by the driving of a wind-up motor 55 as a driving unit.

The wind-up motor 55 is configured to be rotatable forward and backward. In the present exemplary embodiment, the direction of the forward rotation of the wind-up motor 55 is a clockwise (CW) direction, and the direction of the backward rotation of the wind-up motor 55 is a counterclockwise (CCW) direction.

Thus, a configuration is employed in which the wire 54 is wound up around or pulled out of the wind-up drum 59 by the wind-up drum 59 rotating by the rotation of the wind-up motor 55 in the CW direction or the CCW direction. The wire 54 is thus wound up around or pulled out of the wind-up drum 59 and thereby can circularly run on the cover portion 40*b* in the state where the wire 54 is stretched around the tight stretching pulleys 57.

Thus, the first cleaning holder 511 and the second leaning holder 512 that are joined to the wire 54 can move in the directions of arrows D1 and D2 (the longitudinal directions of the transmission members 42) in response to the running of the wire 54. In the present exemplary embodiment, the wind-up motor 55 rotates in the CCW direction, whereby the first cleaning holder 511 and the second cleaning holder 512 move in the direction of the arrow D1. Further, the wind-up motor 55 rotates in the CW direction, whereby the first cleaning holder 511 and the second cleaning holder 512 move in the direction of the arrow D2.

Since the wire 54 is circularly tightly stretched, the first cleaning holder 511 and the second cleaning holder 512 move linearly in directions opposite to each other in the longitudinal directions of the transmission members 42*a* to 42*d* in response to the movement of the wire 54.

In this case, the wind-up motor 55 and the wind-up drum 59 are provided in a recessed portion 60 provided in a recessed manner on an upper surface of the cover portion 40*b*. This can make the size in the height direction of the optical scanning device 40 small. The recessed portion 60 does not communicate with the inside of the optical scanning device 40, and is provided so that a foreign substance does not enter the optical scanning device 40 through the recessed portion 60, either.

Further, in the cover portion 40*b*, a first stopper 56*a* that restricts the movement of the first cleaning holder 511 in the longitudinal directions of the transmission members 42*a* and 42*b* (the rotational axis directions of the photosensitive members 100) is provided. Further, in the cover portion 40*b*, a second stopper 56*b* that restricts the movement of the second cleaning holder 512 in the longitudinal directions of the transmission members 42*c* and 42*d* (the rotational axis directions of the photosensitive members 100) is provided. The first stopper 56*a* and the second stopper 56*b* are examples of an abutment member.

The first stopper 56*a* and the second stopper 56*b* are provided on one end side in the longitudinal directions of the transmission members 42*a* to 42*d*. Thus, if the first cleaning holder 511 and the second cleaning holder 512 move in the direction of the arrow D1, the first cleaning holder 511 reaches end portions of the transmission members 42*a* and 42*b* in the direction of the arrow D1 and abuts the first stopper 56*a*.

Consequently, the movement of the first cleaning holder 511 in the direction of the arrow al is restricted by the first stopper 56*a*, and the load acting on the wind-up motor 55 that rotates the wind-up drum 59 to run the wire 54 becomes great. By detecting this load using a current detection unit described below, it is detected that the first cleaning holder 511 has reached the first stopper 56*a*. At this time, the second cleaning holder 512 is located on the opposite side of the first cleaning holder 511 in the longitudinal directions of the transmission members 42.

A series of cleaning processes by the movements of the first cleaning holder 511 and the second cleaning holder 512 in the present exemplary embodiment is as follows.

First, the wind-up motor 55 is driven to rotate in the CW direction, whereby the wire 54 runs in the direction of the arrow D2, and the first cleaning holder 511 and the second cleaning holder 512 move in the direction of the arrow D2.

Then, the second cleaning holder 512 reaches end portions of the transmission members 42*c* and 42*d* in the direction of the arrow D2 and abuts the second stopper 56*b*. Consequently, the movement of the second cleaning holder 512 in the direction of the arrow D2 is restricted by the second stopper 56*b*, and the load acting on the wind-up motor 55 that rotates the wind-up drum 59 to run the wire 54 becomes great. By detecting this load using the current detection unit described below, it is detected that the second cleaning holder 512 has reached the second stopper 56*b*.

Then, if it is detected that the second cleaning holder 512 has reached the second stopper 56*b*, the rotation of the wind-up motor 55 is stopped. At this time, the first cleaning holder 511 has reached a second position on the other end side in the longitudinal directions of the transmission members 42. Thus, the rotation of the wind-up motor 55 is stopped, whereby the movement of the first cleaning holder 511 is stopped at the second position on the other end side in the longitudinal directions of the transmission members 42.

Then, the wind-up motor 55 is rotated in the CCW direction, thereby running the wire 54 in the direction of the arrow D1. This causes each of the first cleaning holder 511 and the second cleaning holder 512 to move in the direction of the arrow D1.

Then, the first cleaning holder 511 reaches the end portions of the transmission members 42*a* and 42*b* in the direction of the arrow D1 and abuts the first stopper 56*a*. Consequently, the movement of the first cleaning holder 511 in the direction of the arrow D1 is restricted by the first stopper 56*a*, and the load acting on the wind-up motor 55 that rotates the wind-up drum 59 to run the wire 54 becomes great. By detecting this load using the current detection unit described below, it is detected that the first cleaning holder 511 has reached the first stopper 56*a*.

Then, if it is detected that the first cleaning holder 511 has reached the first stopper 56*a*, the rotation of the wind-up motor 55 in the CCW direction is stopped, and the wind-up motor 55 is rotated in the CW direction by a predetermined amount. Consequently, the wire 54 is run by a predetermined distance in the direction of the arrow D2, and then, the rotation of the wind-up motor 55 is stopped.

As described above, in the present exemplary embodiment, one back-and-forth movement of each of the first cleaning holder 511 and the second cleaning holder 512 on the transmission members 42*a* to 42*d* is referred to as a series of cleaning processes. When a series of cleaning processes ends, the wire 54 is run by the predetermined distance in the direction of the arrow D2, whereby the first cleaning holder 511 stops operating at the position where the first cleaning holder 511 does not abut the first stopper 56*a*, and the cleaning members 53 are not in contact with the surfaces of the transmission members 42.

That is, the first cleaning holder 511 is located between the end portions of the transmission members 42 in the longitudinal directions of the transmission members 42 and the first stopper 56*a*, and also in a non-transmission area where beams of laser light do not pass through the transmission members 42. At this time, the second cleaning holder 512 stops operating at the position where the second cleaning holder 512 does not abut the end portions of the transmission members 42 in the longitudinal direction, i.e., a non-transmission area where beams of laser light do not pass through the transmission members 42. The stop positions of the first cleaning holder 511 and the second cleaning holder 512 in a case where the series of cleaning processes ends are a cleaning stop position and a cleaning start position.

In the above series of cleaning processes, a configuration is employed in which the rotation of the wind-up motor 55 is stopped when the second cleaning holder 512 reaches the second stopper 56*b*, and then the wind-up motor 55 is rotated in the CCW direction. Alternatively, a configuration may be employed in which the wind-up motor 55 is rotated in the CCW direction in response to the second cleaning holder 512 reaching the second stopper 56*b*.

In the present exemplary embodiment, a configuration is employed in which the wind-up motor 55 is rotated forward (rotated in the CW direction), thereby running the wire 54 in the direction of the arrow D2. Further, the wind-up motor 55 is rotated backward (rotated in the CCW direction), thereby running the wire 54 in the direction of the arrow D1. Alternatively, a configuration may be employed in which the wire 54 is run in the direction of the arrow D1 by rotating the wind-up motor 55 forward and run in the direction of the arrow D2 by rotating the wind-up motor 55 backward.

Figure 4:
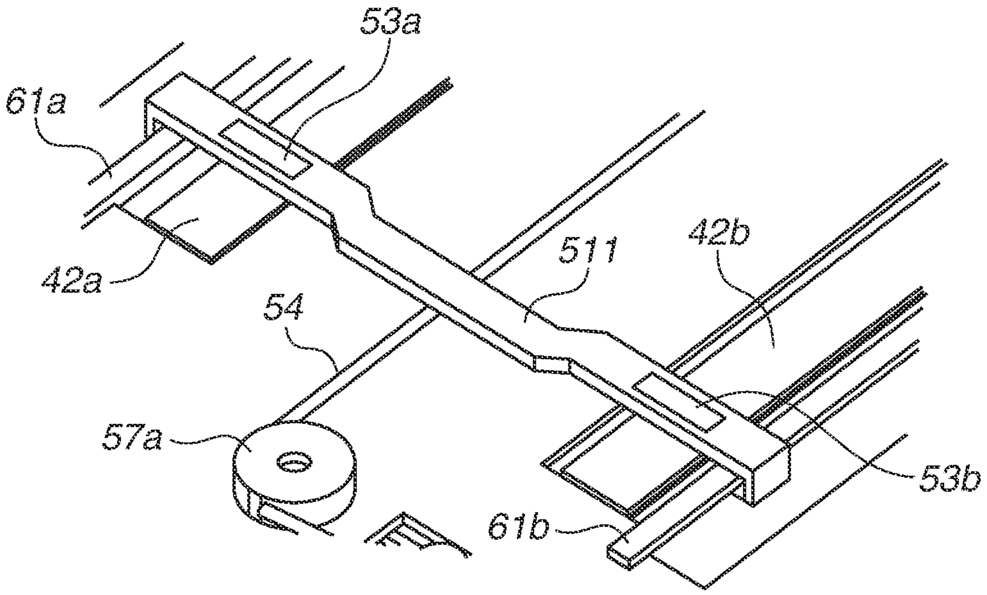
FIG. 4 is a partial perspective view of a first cleaning holder.
Figure 5:
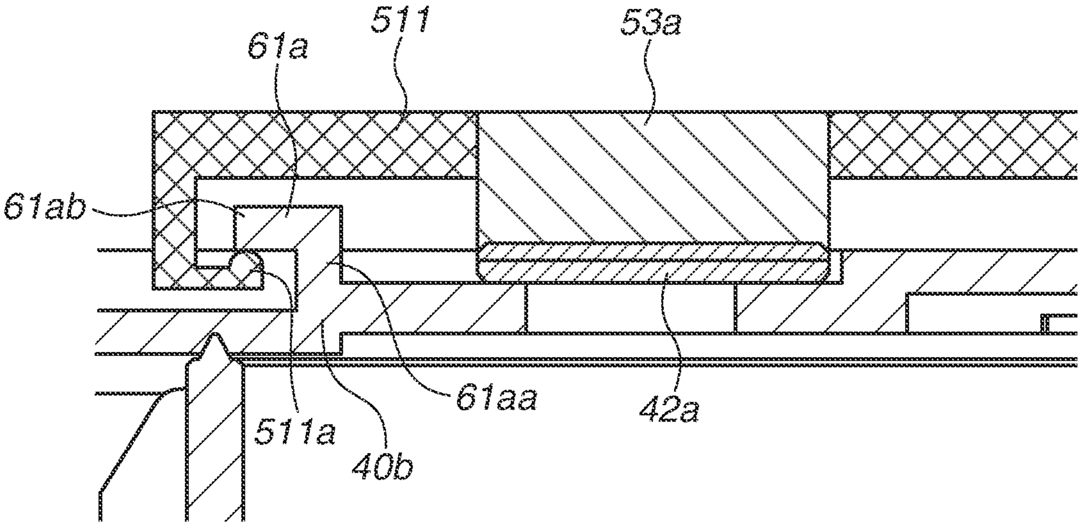
FIG. 5 is a partial cross-sectional view of the first cleaning holder.

Further, in the cover portion 40*b*, guide members 61*a* to 61*d* for guiding the movements of the first cleaning holder 511 and the second cleaning holder 512 are provided. As illustrated in FIGS. 4 and 5, respective end portions of the first cleaning holder 511 are engaged with the guide members 61*a* and 61*b*.

FIG. 4 is a partial perspective view illustrating the neighborhood of the first cleaning holder 511. Also in the second cleaning holder 512, similarly to the configuration of the first cleaning holder 511, respective end portions of the second cleaning holder 512 are engaged with the guide members 61*c* and 61*d*. FIG. 5 is a partial cross-sectional view of an end portion of the first cleaning holder 511 on the side where the first cleaning holder 511 holds the cleaning member 53*a*. Although only the configuration of the first cleaning holder 511 is described here, in the present exemplary embodiment, a similar configuration is also used in the second cleaning holder 512.

As illustrated in FIGS. 4 and 5, the guide members 61*a* to 61*b* are formed integrally with the cover portion 40*b* and provided to protrude upward from the upper surface of the cover portion 40*b*.

As illustrated in FIG. 5, each of the guide members 61*a* includes a first protruding portion 61*aa* that protrudes upward relative to the upper surface of the cover portion 40*b*, and a second protruding portion 61*ab* that extends from the first protruding portion 61*aa* in a direction away from the cleaning member 53*a*.

An end portion 511*a* on one end side of the first cleaning holder 511 is formed such that the end portion 511*a* slips under the second protruding portion 61*ab*. A configuration is employed in which a portion of the end portion 511*a* that abuts the second protruding portion 61*ab* has an arc shape. The end portion 511*a* thus has an arc shape, whereby it is possible to reduce the sliding contact resistance of the first cleaning holder 511 moving in the direction of the arrow D1 or the direction of the arrow D2 (see FIG. 3).

In the present exemplary embodiment, although only one end side of the first cleaning holder 511 is described in detail, the other end side also has a similar configuration. Further, the second cleaning holder 512 also has a similar shape.

Further, the first cleaning holder 511 and the second cleaning holder 512 are engaged with the guide members 61*a* to 61*d*, thereby preventing the cleaning members 53*a* to 53*d* held by the first cleaning holder 511 and the second cleaning holder 512 from moving in directions away from the transmission members 42*a* to 42*d*. At this time, the engagement positions of the first cleaning holder 511 and the second cleaning holder 512 and the guide members 61*a* to 61*d* are the positions where the cleaning members 53*a* to 53*d* are in contact with the transmission members 42*a* to 42*d* at a predetermined contact pressure.

Further, in the present exemplary embodiment, a configuration is employed in which the guide members 61*a* to old, the first stopper 56*a*, and the second stopper 56*b* are formed of a resin integrally with the cover portion 40*b*. Alternatively, the guide members 61*a* to 61*d*, the first stopper 56*a*, and the second stopper 56*b* may be configured separately from the cover portion 40*b*.

As described above, in the present exemplary embodiment, when a cleaning process is performed, the first cleaning holder 511 and the second cleaning holder 512 are moved in the direction of the arrow D1 or the direction of the arrow D2, whereby it is possible to clean the upper surfaces of the transmission members 42*a* to 42*d*. This cleaning process is executed in a case where an instruction to execute the cleaning process is received from the operator through the operation unit 304 at any timing, or periodically executed according to the fact that the accumulated number of sheets on which images are formed reaches a predetermined number of sheets.

In this case, the predetermined number of sheets based on which the cleaning process is periodically executed is set in advance to 10000 as an initial setting. By inputting a value such as 500 in place of this initial setting through the operation unit 304, the operator can change the setting of the predetermined number of sheets based on which the cleaning process is executed.

As described above, in a case where the cleaning process is periodically executed, and if the number of formed images reaches the predetermined number of sheets in the middle of the execution of an image forming job, the cleaning process is performed by temporarily stopping the image forming job and causing the cleaning mechanism 51 to operate. However, since the image forming job is temporarily stopped, the operator executing the image forming job needs to wait until the cleaning process is completed. This impairs usability.

In the present exemplary embodiment, the timing when the cleaning process is executed is changed according to the content of an image forming job, even in a case where the cleaning process is periodically executed, so as to reduce the time taken to keep the operator waiting.

Figure 6:
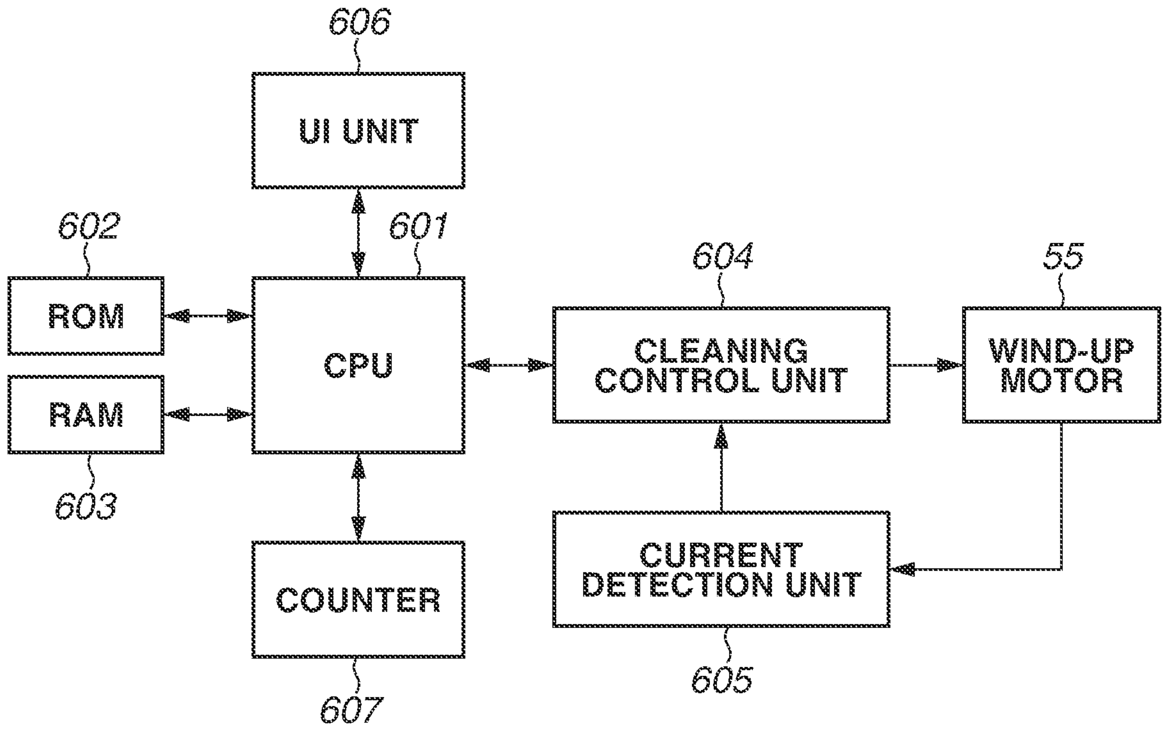
FIG. 6 is a control block diagram for performing a cleaning process.
Figure 7:
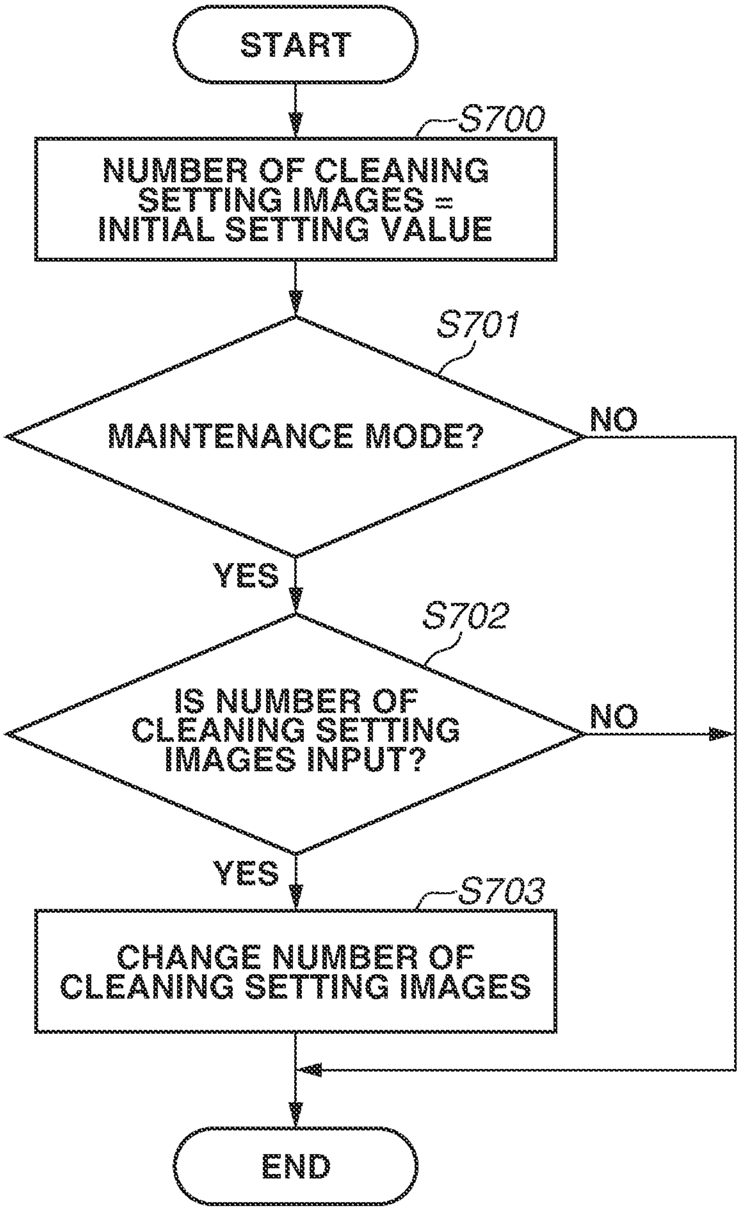
FIG. 7 is a flowchart illustrating a process of setting the number of cleaning setting images.
Figure 8:
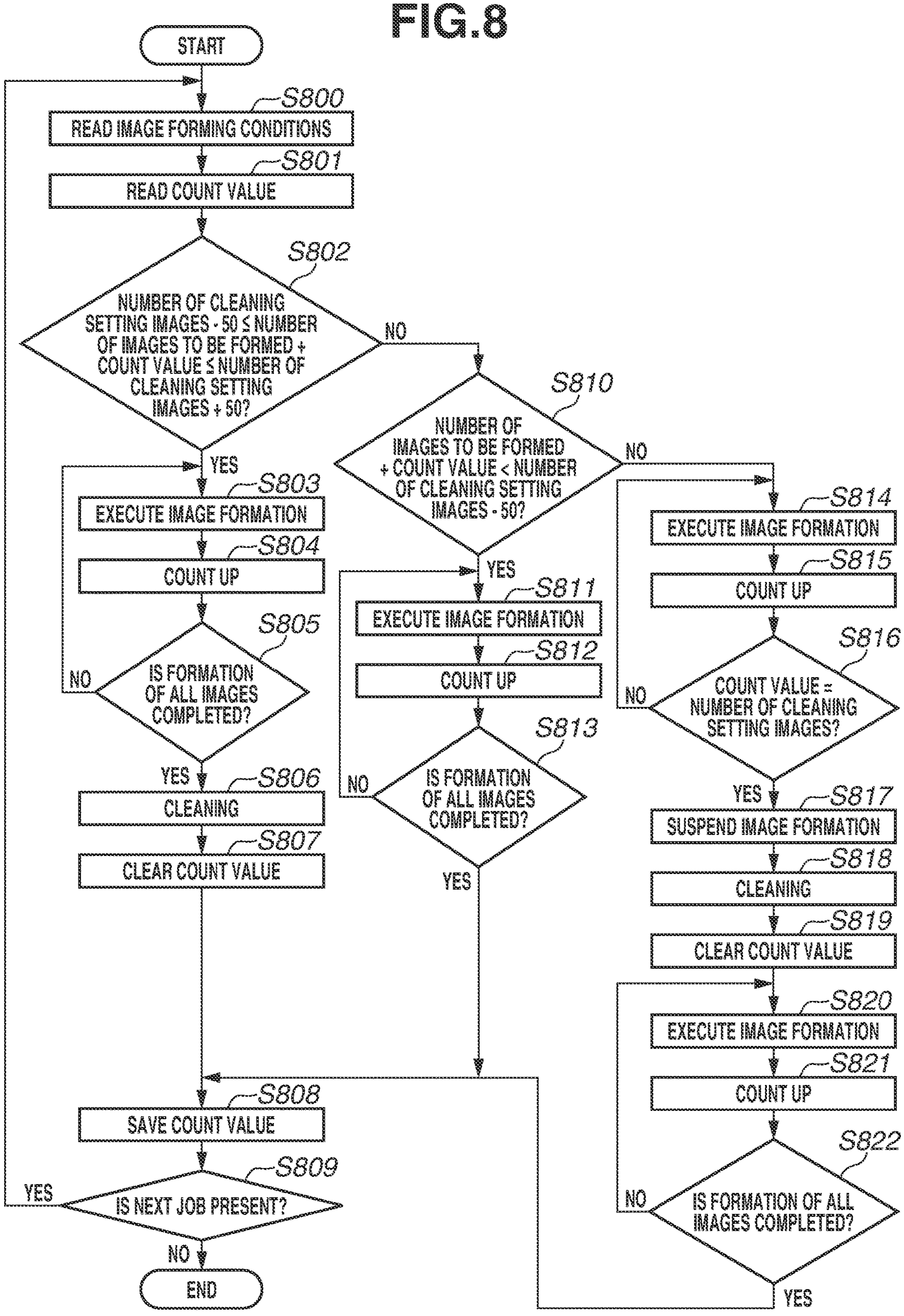
FIG. 8 is a flowchart illustrating a sequence when an image forming job is executed according to a first exemplary embodiment.

With reference to FIGS. 6 to 8, a description will be given below of a sequence at a time an image forming job is executed according to the present exemplary embodiment. FIG. 6 is a control block diagram illustrating a control configuration for performing the sequence when an image forming job is executed according to the present exemplary embodiment. Further, FIG. 7 is a flowchart illustrating the sequence when an image forming job is executed according to the present exemplary embodiment.

In the present exemplary embodiment, the CPU 601 controls the entire image forming apparatus 1 and performs control in the sequence of an image forming job. Further, the CPU 601 reads a firmware program stored in a read-only memory (ROM) 602 and a boot program for controlling the firmware program and executes various types of control using the RAM 603, which is a storage unit, as a work area and a primary storage area for data.

The CPU 601 is connected to a cleaning control unit 604 that controls the optical scanning device 40. The CPU 601 controls the cleaning mechanism 51 via the cleaning control unit 604. Based on an instruction to execute the cleaning process from the CPU 601, the cleaning control unit 604 drives the wind-up motor 55 to rotate in the CW direction or the CCW direction. That is, the CPU 601 controls the wind-up motor 55 in the cleaning process via the cleaning control unit 604.

In the present exemplary embodiment, as described above, a current detection unit 605 that detects the driving current of the wind-up motor 55 and outputs the detection result to the cleaning control unit 604 is provided. Based on the detection result of the current detection unit 605, the cleaning control unit 604 controls the rotational movement of the wind-up motor 55 in the CW direction or the CCW direction, or the stoppage of the wind-up motor 55. At this time, as described above, based on the detection result of the current detection unit 605, the cleaning control unit 604 determines that the first cleaning holder 511 abuts the first stopper 56*a*, or the second cleaning holder 512 abuts the second stopper 56*b*.

The wind-up motor 55 is controlled at a constant voltage. If the first cleaning holder 511 abuts the first stopper 56*a*, or the second cleaning holder 512 abuts the second stopper 56*b*, the driving current of the wind-up motor 55 increases as the load acting on the wind-up motor 55 increases.

Thus, if the driving current of the wind-up motor 55 detected by the current detection unit 605 becomes larger than a predetermined value, the cleaning control unit 604 detects that the first cleaning holder 511 abuts the first stopper 56*a*, or the second cleaning holder 512 abuts the second stopper 56*b*, and the movements of the transmission members 42*a* to 42*d* in one direction from one end portion to another end portion has ended. That is, the cleaning control unit 604 detects that cleaning in one way of the back-and-forth movement in the cleaning process has ended.

The “predetermined value” is a value greater than the value of the driving current flowing through the wind-up motor 55 while the first cleaning holder 511 or the second cleaning holder 512 moves on the transmission members 42. That is, the “predetermined value” is a value greater than the value of the driving current flowing through the wind up motor 55 before the first cleaning holder 511 abuts the first stopper 56*a*, or the second cleaning holder 512 abuts the second stopper 56*b*. Further, the "predetermined value" is a value that enables detection of the first cleaning holder 511 abutting the first stopper 56*a*, or the second cleaning holder 512 abutting the second stopper 56*b*. The "predetermined value" is set to a value that does not include a current value that increases due to another change such as the breakdown of a motor.

In the present exemplary embodiment, determination of whether the first cleaning holder 511 abuts the first stopper 56*a*, or the second cleaning holder 512 abuts the second stopper 56*b* is made by comparing the detected current value with the predetermined value. Alternatively, the determination may be made using another method. For example, the determination may be made not by comparing the detected current value with the predetermined value, but by determining the amount of change in the detected current value.

Further, the CPU 601 is connected to a user interface unit (hereinafter, "UI unit") 606 that receives an instruction from the operator via the operation unit 304. The CPU 601 receives an instruction to execute an image forming job or an instruction to execute the cleaning process from the operator using the UI unit 606. Further, the CPU 601 receives via the UI unit 606 the setting of the number of images to be formed for the periodic cleaning process. In this case, upon receiving the setting of the number of images to be formed from the operator, the CPU 601 saves the received setting as the number of cleaning setting images in the RAM 603.

Then, if the CPU 601 receives an image forming job, every time the CPU 601 forms an image on a sheet using the image formation units 10, the CPU 601 outputs number-of-formed-images information to a counter 607 and increments the count value of the counter 607 by 1. In this case, the CPU 601 outputs the number-of-formed-images information to the counter 607 such that when a sheet passes through the image formation units 10, 1 is counted, or when an image is formed on a sheet by the image formation units 10, 1 is counted. At this time, in a case where the number of times an image is formed on a sheet is counted, for example, every time an image is formed on a single sheet, 1 may be counted. Alternatively, every time an image is formed on either one of the front and back pages of a sheet, 1 may be counted. In a case where 1 is counted every time an image is formed on a single page of a sheet, if two-sided printing is performed on an A4-size sheet, the sheet is counted as a two-page sheet. That is, if two-sided printing is performed, "a single sheet" is "counted as two pages (two counts)". As described above, the counter 607 counts the number of pages of sheets on which images are formed, or the number of sheets on which images are formed, and outputs the count value to the CPU 601.

Then, the CPU 601 compares the count value output from the counter 607 with the number of cleaning setting images saved in the RAM 603 and determines whether the cleaning process is to be executed. As a result of the determination, if the cleaning process is to be executed, the CPU 601 controls the cleaning mechanism 51 via the cleaning control unit 604 to execute the cleaning process as described above. At this time, after the cleaning process is executed, the CPU 601 sets the count value of the counter 607 to 0, thereby resetting the count value.

In the present exemplary embodiment, a configuration is employed in which the CPU 601 controls the entire image forming apparatus 1. Alternatively, similar control may be performed using several built-in modules. Further, a configuration may be employed in which the wind-up motor 55 is controlled directly by the CPU 601, not via the cleaning control unit 604.

Next, a description will be given of a setting sequence for setting the number of cleaning setting images to periodically perform the cleaning process by the CPU 601, with reference to FIG. 7.

First, when the image forming apparatus 1 starts, then in step S700, the CPU 601 saves the number of cleaning setting images as an initial setting value in the RAM 603. The initial setting value of the number of cleaning setting images is 1000, for example.

Then, in step S701, the CPU 601 determines whether the operator performs an operation regarding a maintenance mode via the UI unit 606. If an operation regarding the maintenance mode is not performed (No in step S701), the CPU 601 sets the number of cleaning setting images as the initial setting value and ends the setting sequence for setting the number of cleaning setting images. If an operation regarding the maintenance mode is performed (Yes in step S701), then in step S702, the CPU 601 determines whether the operator inputs the number of cleaning setting images.

If the operator does not input the number of cleaning setting images (No in step S702), the CPU 601 sets the number of cleaning setting images as the initial setting value and ends the setting sequence for setting the number of cleaning setting images. If, on the other hand, the operator inputs the number of cleaning setting images (Yes in step S702), then in step S703, the CPU 601 changes the number of cleaning setting images to the number set by the operator, saves the number of cleaning setting images in the RAM 603, and ends the setting sequence for setting the number of cleaning setting images.

Next, a description will be given of an image forming sequence according to the present exemplary embodiment by the CPU 601 with reference to FIG. 8. FIG. 8 is a flowchart illustrating the image forming sequence according to the present exemplary embodiment.

First, upon receiving an image forming job from the operator through the operation unit 304, then in step S800, the CPU 601 reads print conditions such as the specified number of images to be formed and one-sided or two-sided printing and saves operation settings for the received image forming job in the RAM 603.

When the number of images to be formed is set according to the operation settings saved in step S800, then in step S801, the CPU 601 acquires the count value of the counter 607. Then, in step S802, the CPU 601 calculates the total number of images to be formed set by the user in step S800 and the count value read in step S801 and determines whether the total value is greater than or equal to the number of cleaning setting images−50 and less than or equal to the number of cleaning setting images+50. At this time, in the present exemplary embodiment, the value of the number of cleaning setting images plus or minus 50 is a neighborhood value, and a value in the range from the number of cleaning setting images−50 to the number of cleaning setting images+50 is a predetermined value. Further, the value of the number of cleaning setting images−50 is an example of a first number of images, and the value of the number of cleaning setting images+50 is an example of a second number of images and a second number of cleaning setting images. Further, the number of cleaning setting images in this case is an example of a predetermined number of images or a first number of cleaning setting images.

If the total value is greater than or equal to the number of cleaning setting images−50 and less than or equal to the number of cleaning setting images+50 (Yes in step S802), then in step S803, the CPU 601 executes an image forming operation. Every time the CPU 601 performs an image forming operation on a sheet, then in step S804, the CPU 601 adds 1 to the count value of the counter 607. Then, in step S805, the CPU 601 determines whether the formation of all images in the image forming job set by the operator in step S800 is completed. Then, if the formation of all images is not completed (No in step S805), the CPU 601 continues executing the image forming job. Then, every time the CPU 601 forms an image on a sheet, the CPU 601 adds 1 to the count value of the counter 607. Further, if the formation of all images is completed (Yes in step S805), then in step S806, the CPU 601 outputs a cleaning execution instruction to the cleaning control unit 604 and controls the cleaning mechanism 51 to perform cleaning.

Then, in step S807, the CPU 601 clears the count value of the counter 607. In step S808, the CPU 601 saves 0 as the count value in the RAM 603. In step S809, the CPU 601 determines whether a next image forming job is received. If a next image forming job is received (Yes in step S809), the processing returns to step S800. If a next image forming job is not received (No in step S809), the image forming sequence ends.

Further, if the total value of the number of images to be formed saved in step S800 and the count value acquired in step S801 is not greater than or equal to the number of cleaning setting images−50 and less than or equal to the number of cleaning setting images+50 (No in step S802), then in step S810, the CPU 601 determines whether the total value is less than the number of cleaning setting images−50. If the total value is less than the number of cleaning setting images−50 (Yes in step S810), then in step S811, the CPU 601 executes an image forming operation. In step S812, the CPU 601 adds 1 to the count value of the counter 607.

Then, in step S813, the CPU 601 determines whether the formation of all images in the image forming job set by operator in step S800 is completed. If the formation of all images is not completed (No in step S813), the CPU 601 continues executing the image forming job. Then, every time the CPU 601 forms an image on a sheet, then in step S812, the CPU 601 adds 1 to the count value of the counter 607. Further, if the formation of all images is completed (Yes in step S813), then in step S808, the CPU 601 saves the count value of the counter 607 at this time in the RAM 603. Then, if a next image forming job is received (Yes in step S809), the processing returns to step S800. If a next image forming job is not received (No in step S809), the image forming sequence ends.

Further, if the total value of the number of images to be formed saved in step S800 and the count value acquired in step S801 is greater than the number of cleaning setting images+50 (No in step S810), then in step S814, the CPU 601 executes an image forming operation. After forming an image on a sheet in step S814, then in step S815, the CPU 601 increments the count value of the counter 607 by 1.

Then, in step S816, the CPU 601 determines whether the count value of the counter 607 counted up in step S815 has reached the number of cleaning setting images. At this time, in step S815, for example, if the count value is 100, and an image is formed on a single sheet, 1 is added to the count value, and the count value becomes 101. Then, in step S816, the CPU 601 acquires a value of 101, compares the acquired value with the number of cleaning setting images saved in the RAM 603, and determines whether the count value is equal to the number of cleaning setting images.

Then, until it is determined in step S816 that the count value is equal to the number of cleaning setting images (No in step S816), the CPU 601 executes an image forming operation. If it is determined in step S816 that the count value is equal to the number of cleaning setting images (Yes in step S816), then in step S817, the CPU 601 suspends the image forming job.

Then, in step S818, the CPU 601 outputs a cleaning execution instruction to the cleaning control unit 604 and performs the cleaning process. When the cleaning process in step S818 is completed, then in step S819, the CPU 601 clears the count value of the counter 607. In step S820, the CPU 601 resumes the suspended image forming job and executes an image forming operation.

After executing the image forming operation in step S820, then in step S821, the CPU 601 increments the count value of the counter 607 by 1. Then, in step S822, the CPU 601 determines whether the formation of all images in the image forming job set by the operator n step S800 is completed. If the formation of all images is not completed (No in step S822), the CPU 601 continues executing the image forming job. Then, every time the CPU 601 forms an image on a single sheet, the CPU 601 adds 1 to the count value of the counter 607. If the formation of all images is completed (Yes in step S822), then in step S808, the CPU 601 saves the count value at this time in the RAM 603.

Then, if a next image forming job is received (Yes in step S809), the processing returns to step S800. If a next image forming job is not received (No in step S809), the image forming sequence ends.

As described above, in the present exemplary embodiment, the image forming job is not suspended even when a count value (the number of formed images) reaches the number of cleaning setting images in the middle of the execution of an image forming job. After the image forming job is completed, a cleaning process is performed. Thus, an operator who gives an instruction execute the image forming job is not kept waiting. Thus, it is possible to prevent a reduction in usability.

Further, in the present exemplary embodiment, when an image forming job is received from the operator, it is determined whether a value obtained by totaling the number of images to be formed in the job and the current count value (the accumulated number of formed images) is in the range of the number of cleaning setting images plus or minus 50. Then, the timing at which the cleaning process is performed is changed. Consequently, when an image forming job is completed, the cleaning process is performed even when the accumulated number of formed images is less than the number of cleaning setting images but is the number of images near the number of cleaning setting images. In this way, when a next image forming job is performed, it is possible to prevent the suspension of the image forming job due to the cleaning process. Further, when the image forming job is completed, the cleaning process is performed even when the accumulated number of formed images is greater than the number of cleaning setting images but is the number of images near the number of cleaning setting images. In this way, it is possible to prevent downtime from occurring due to the suspension of the job.

Further, if another image forming job that will greatly exceed the number of cleaning setting images is received during the execution of an image forming job, the image forming job is suspended for the cleaning process. However, by doing so, it is possible to prevent a deterioration in image quality due to the existence of a foreign substance on the transmission members 42.

In the present exemplary embodiment, a predetermined range is set such that a value in the range of the number of cleaning setting images plus or minus 50 is a neighborhood value of the number of cleaning setting images. Alternatively, the neighborhood value or the predetermined range of the number of cleaning setting images may be varied according to the amount of stain on the transmission members 42 when the image forming apparatus 1 is caused to operate. For example, a value in the range of the number of cleaning setting images plus or minus 100 may be a neighborhood value of the number of cleaning setting images.

Next, a second exemplary embodiment will be described. The second exemplary embodiment is similar in configuration to the first exemplary embodiment, except that a neighborhood value of the number of cleaning setting images for use in determining the execution timing of the cleaning process when an image forming job is received is different. Thus, similar components are designated by the same signs, and are not described here.

Figure 9:
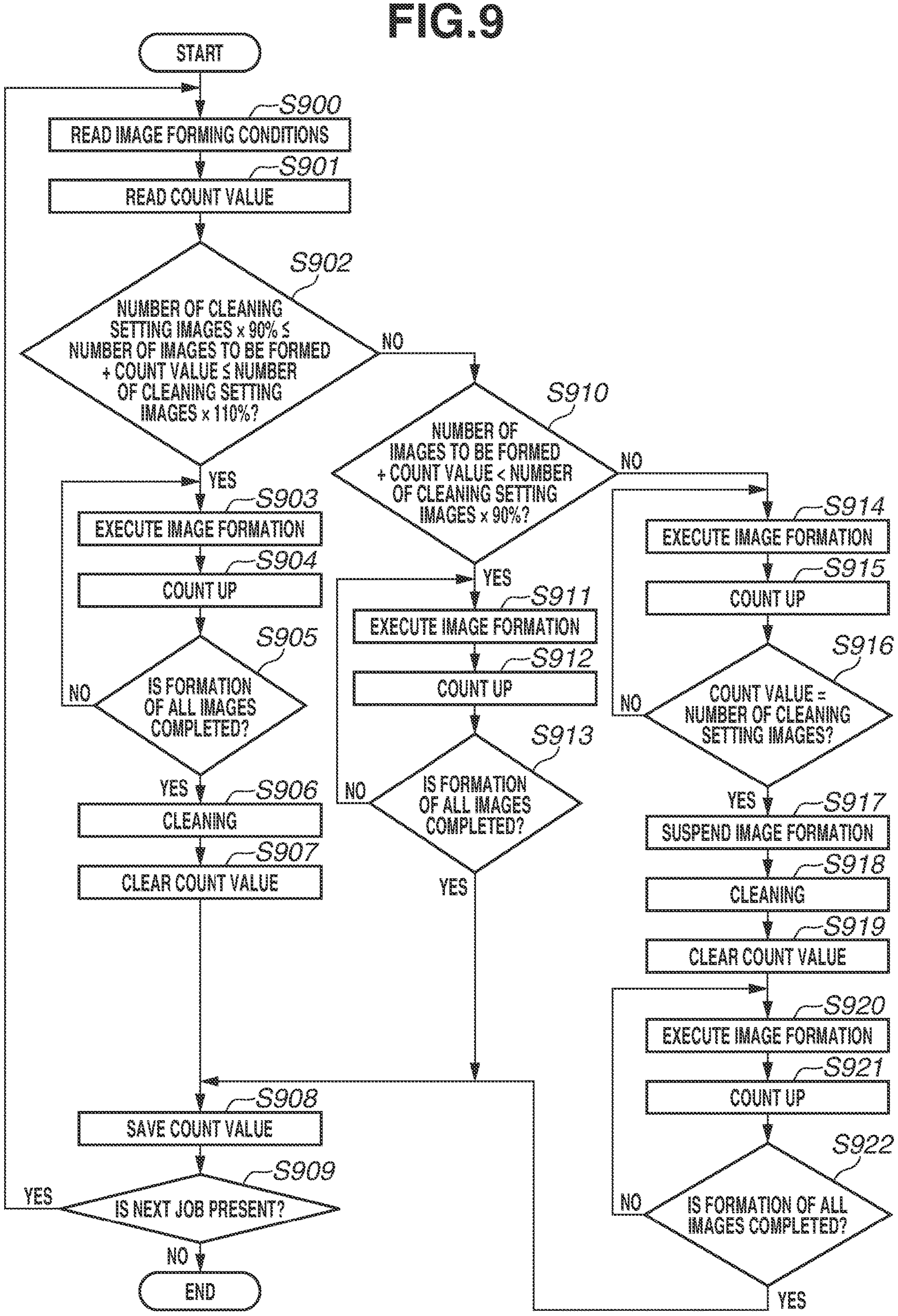
FIG. 9 is a flowchart illustrating a sequence when an image forming job is executed according to a second exemplary embodiment.

FIG. 9 is a flowchart illustrating an image forming sequence according to the second exemplary embodiment. First, upon receiving an image forming job from the operator via the operation unit 304, then in step S900, the CPU 601 reads print conditions such as the specified number of images to be formed and one-sided or two-sided printing and saves operation settings for the received image forming job in the RAM 603.

When the number of images to be formed is set according to the operation settings saved in step S900, then in step S901, the CPU 601 acquires the count value of the counter 607. Then, in step S902, the CPU 601 calculates the total value of the number of images to be formed set by the user in step S900 and the count value read in step S901 and determines whether the total value is greater than or equal to the number of cleaning setting images−10% and less than or equal to the number of cleaning setting images±10%. In the present exemplary embodiment, the value of the number of cleaning setting images plus or minus 10% is a neighborhood value, and the range from the number of cleaning setting images×90% to the number of cleaning setting images×110% is a predetermined range including a predetermined value. That is, in step S902, the CPU 601 determines whether the total value of the number of images to be formed in the image forming job and the current count value is a value greater than or equal to 90% of the number of cleaning setting images and less than or equal to 110% of the number of cleaning setting images. More specifically, if the number of cleaning setting images is 1000, then in step S902, the CPU 601 determines whether the total value of the number of images to be formed in the image forming job and the current count value is greater than or equal to 900 and less than or equal to 1100. At this time, the value of the number of cleaning setting images×90% is an example of a first number of images, and the value of the number of cleaning setting images×110% is an example of a second number of images or a second number of cleaning setting images. Further, the number of cleaning setting images in this case is an example of a predetermined number of images or a first number of cleaning setting images.

If the total value is greater than or equal to the number of cleaning setting images−10% and less than or equal to the number of cleaning setting images+10% (Yes in step S902), then in step S903, the CPU 601 executes an image forming operation. After performing an image forming operation on a sheet, then in step S904, the CPU 601 adds 1 to the count value of the counter 607. Then, in step S905, the CPU 601 determines whether the formation of all images in the image forming job set by the operator in step S900 is completed. If the formation of all images is not completed (No in step S905), the CPU 601 continues executing the image forming job. Then, every time the CPU 601 forms an image on a sheet, the CPU 601 adds 1 to the count value of the counter 607. Further, if the formation of all images is completed (Yes in step S905), then in step S906, the CPU 601 outputs a cleaning execution instruction to the cleaning control unit 604 and controls the cleaning mechanism 51 to perform cleaning.

Then, in step S907, the CPU 601 clears the count value of the counter 607. In step S908, the CPU 601 saves 0 as the count value in the RAM 603. Then, in step S909, the CPU 601 determines whether a next image forming job is received. If a next image forming job is received (Yes in step S909), the processing returns to step S900. If a next image forming job is not received (No in step S909), the image forming sequence ends.

Further, if the total value of the number of images to be formed saved in step S900 and the count value acquired in step S901 is not greater than or equal to the number of cleaning setting images−10% and less than or equal to the number of cleaning setting images+10% (No in step S902), then in step S910, the CPU 601 determines whether the total value is less than the number of cleaning setting images−10%. If the total value is less than the number of cleaning setting images−10% (Yes in step S910), then in step S911, the CPU 601 executes an image forming operation. In step S912, the CPU 601 adds 1 to the count value of the counter 607.

Then, in step S913, the CPU 601 determines whether the formation of all images in the image forming job set by the operator in step S900 is completed. If the formation of all images is not completed (No in step S913), the CPU 601 continues executing the image forming job. Then, every time the CPU 601 forms an image on a sheet, then in step S912, the CPU 601 adds 1 to the count value of the counter 607. Further, if the formation of all images is completed (Yes in step S913), then in step S908, the CPU 601 saves the count value of the counter 607 at this time in the RAM 603. Then, if a next image forming job is received (Yes in step S909), the processing returns to step S900. If a next image forming job is not received (No in step S909), the image forming sequence ends.

Further, if the total value of the number of images to be formed saved in step S900 and the count value acquired in step S901 is greater than the number of cleaning setting images+10% (NO in step S910), then in step S914, the CPU 601 executes an image forming operation. After forming an image on a sheet in step S914, then in step S915, the CPU 601 increments the count value of the counter 607 by 1.

Then, in step S916, the CPU 601 determines whether the count value of the counter 607 counted up in step S915 has reached the number of cleaning setting images.

Then, until it is determined in step S916 that the count value is equal to the number of cleaning setting images in step S916), the CPU 601 executes an image forming operation. If it is determined in step S916 that the count value is equal to the number of cleaning setting images (Yes in step S916), then in step S917, the CPU 601 suspends the image forming job.

Then, in step S918, the CPU 601 outputs a cleaning execution instruction to the cleaning control unit 604 and performs the cleaning process. Then, if the cleaning process in step S918 is completed, then in step S919, the CPU 601 clears the count value of the counter 607. In step S920, the CPU 601 resumes the suspended image forming job and executes an image forming operation.

Then, after executing the image forming operation in step S920, then in step S921, the CPU 601 increments the count value of the counter 607 by 1. Then, in step S922, the CPU 601 determines whether the formation of all images in the image forming job set by the operator in step S900 is completed. If the formation of all images is not completed (No in step S922), the CPU 601 continues executing the image forming job. Then, every time the CPU 601 forms an image on a single sheet, the CPU 601 adds 1 to the count value of the counter 607. If the formation of all images is completed (Yes in step S922), then in step S908, the CPU 601 saves the count value at this time in the RAM 603.

Then, if a next image forming job is received (Yes in step S909), the processing returns to step S900. If a next image forming job is not received (No in step S909), the image forming sequence ends.

As described above, in the present exemplary embodiment, even if a count value (the number of formed images) reaches the number of cleaning setting images in the middle of the execution of an image forming job, the image forming job is not suspended. Then, after the image forming job is completed, a cleaning process is performed. Thus, an operator who gives an instruction to execute the image forming job is not kept waiting. Thus, it is possible to prevent a reduction in usability.

Further, in the present exemplary embodiment, when an image forming job is received from the operator, it is determined whether a value obtained by totaling the number of images to be formed in the job and the current count value (the accumulated number of formed images) is a neighborhood value of the number of cleaning setting images (is greater than or equal to the number of cleaning setting images−10% and less than or equal to the number of cleaning setting images+10%). Then, the timing when the cleaning process is performed is changed accordingly. Consequently, when an image forming job is completed, the cleaning process is performed even when the accumulated number of formed images is less than the number of cleaning setting images but is the number of images near the number of cleaning setting images. In this way, when a next image forming job is performed, it is possible to prevent the suspension of the image forming job due to the cleaning process. Further, when the image forming job is completed, the cleaning process is performed even when the accumulated number of formed images is greater than the number of cleaning setting images but is the number of images near the number of cleaning setting images. In this way, it is possible to prevent downtime from occurring due to the suspension of the job. Thus, it is possible to suppress a reduction in usability.

Further, if, during the execution of an image forming job, another image forming job that will greatly exceed the number of cleaning setting images is received, the image forming job is suspended due to the cleaning process, but it is possible to prevent a deterioration in image quality due to the existence of a foreign substance on the transmission members 42. Thus, the operator does not need to perform the image forming job again due to a deterioration in image quality. As a result, it is possible to suppress a reduction in usability.

Further, in the present exemplary embodiment, a value in the range of the number of cleaning setting images plus or minus 10% is a neighborhood value of the number of cleaning setting images. Consequently, even if the operator is allowed to change the number of cleaning setting images, the execution timing of the cleaning process can be changed based on a neighborhood value according to the set number of cleaning setting images. Consequently, it is possible to prevent the execution timing of the cleaning process from being too early or too late for the number of cleaning setting images set by the operator. Thus, it is possible to suppress a deterioration in image quality due to the cleaning process not being performed, and also suppress a reduction in usability due to the frequent execution of the cleaning process due to the cleaning timing being moved up.

Next, a third exemplary embodiment will be described. The third exemplary embodiment is similar in configuration to the first exemplary embodiment, except that a neighborhood value of the number of cleaning setting images for use in determining the execution timing of the cleaning process when an image forming job is received is different. Thus, similar components are designated by the same signs, and are not described here.

Figure 10:
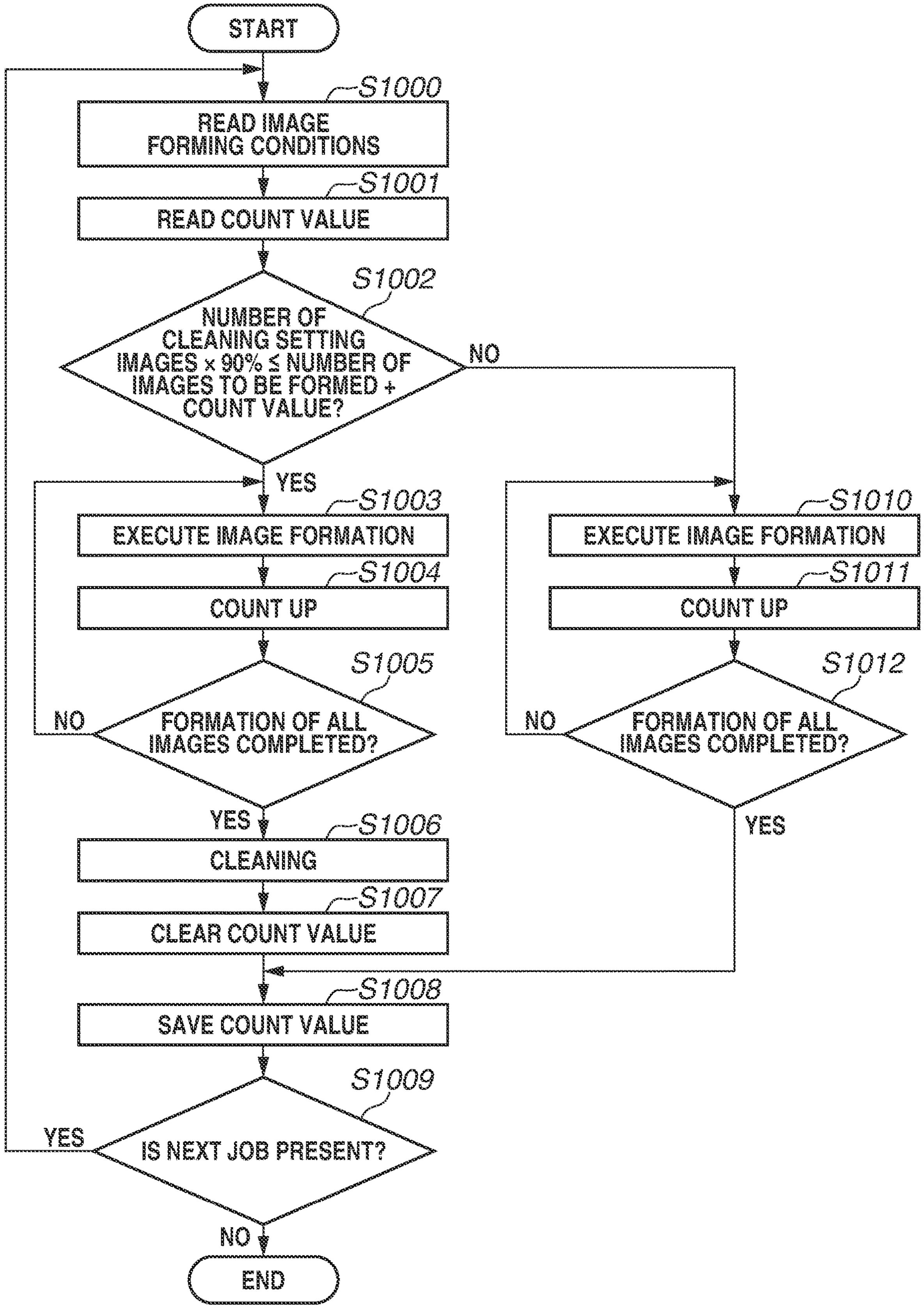
FIG. 10 is a flowchart illustrating a sequence when an image forming job is executed according to a third exemplary embodiment.

FIG. 10 is a flowchart illustrating an image forming sequence according to the third exemplary embodiment. First, upon receiving an image forming job from the operator through the operation unit 304, then in step S1000, the CPU 601 reads print conditions such as the specified number of images to be formed and one-sided or two-sided printing and saves operation settings for the received image forming job in the RAM 603.

If the number of images to be formed is set according to the operation settings saved in step S1000, then in step S1001, the CPU 601 acquires the count value of the counter 607. Then, in step S1002, the CPU 601 calculates the total value of the number of images to be formed set by the user in step S1000 and the count value read in step S1001 and determines whether the total value is greater than or equal to the number of cleaning setting images−10%. At this time, in the present exemplary embodiment, the value of the number of cleaning setting images−10% is a neighborhood value, and the range from the number of cleaning setting images×90% to the number of cleaning setting images is a predetermined range including a predetermined value. That is, in step S1002, the CPU 601 determines whether the total value of the number of images to be formed in the image forming job and the current count value is a value greater than or equal to 90% of the number of cleaning setting images. More specifically, in a case where the number of cleaning setting images is 1000, then in step S1002, the CPU 601 determines whether the total value of the number of images to be formed in the image forming job and the current count value is greater than or equal to 900. At this time, the value of the number of cleaning setting images×90% is an example of a first number of images, and the value of the number of cleaning setting images×110% is an example of a second number of images. Further, the number of cleaning setting images is an example of a predetermined number of images.

If the total value is greater than or equal to the number of cleaning setting images−10% (Yes in step S1002), then in step S1003, the CPU 601 executes an image forming operation. After performing an image forming operation on a sheet, then in step S1004, the CPU 601 adds 1 to the count value of the counter 607. Then, in step S1005, the CPU 601 determines whether the formation of all images in the image forming job set by the operator in step S1000 is completed. If the formation of all images is not completed (No in step S1005), the CPU 601 continues executing the image forming job. Then, every time the CPU 601 forms an image on a sheet, the CPU 601 adds 1 to the count value of the counter 607. Further, if the formation of all images is completed (Yes in step S1005), then in step S1006, the CPU 601 outputs a cleaning execution instruction to the cleaning control unit 604 and controls the cleaning mechanism 51 to perform cleaning.

Then, in step S1007, the CPU 601 clears the count value of the counter 607. In step S1008, the CPU 601 saves 0 as the count value in the RAM 603. Then, in step S1009, the CPU 601 determines whether a next image forming job is received. If a next image forming job is received (Yes in step S1009), the processing returns to step S1000. If a next image forming job is not received (No in step S1009), the image forming sequence ends.

Further, if the total value of the number of images to be formed saved in step S1000 and the count value acquired in step S1001 is not greater than or equal to the number of cleaning setting images−10% (No in step S1002), the total value is less than the number of cleaning setting images−10%. Thus, in step S1010, the CPU 601 executes an image forming operation. In step S1011, the CPU 601 adds 1 to the count value of the counter 607.

Then, in step S1012, the CPU 601 determines whether the formation of all images in the image forming job set by the operator in step S1000 is completed. If the formation of all images is not completed (No in step S1012), the CPU 601 continues executing the image forming job. Every time the CPU 601 forms an image on a sheet, then in step S1011, the CPU 601 adds 1 to the count value of the counter 607. Further, if the formation of all images is completed (Yes in step S1012), then in step S1008, the CPU 601 saves the count value of the counter 607 at this time in the RAM 603. Then, if a next image forming job is received (Yes in step S1009), the processing returns to step S1000. If a next image forming job is not received (No in step S1009), the image forming sequence ends.

As described above, in the present exemplary embodiment, a configuration is employed in which a cleaning operation is executed after the image forming job is completed if the total value of the accumulated number of formed images and the number of images to be formed in an image forming job set by a user is in the range from the number of cleaning setting images×90% to the number of cleaning setting images. That is, the range near the number of cleaning setting images is narrower than that in the second exemplary embodiment.

Also in this configuration, when an image forming job is completed, a cleaning process is performed even when the accumulated number of formed images is less than the number of cleaning setting images but is the number of images near the number of cleaning setting images. In this way, when a next image forming job is performed, it is possible to prevent the suspension of the image forming job due to the cleaning process.

Next, a fourth exemplary embodiment will be described. The fourth exemplary embodiment is similar in configuration to the first exemplary embodiment, except that a neighborhood value of the number of cleaning setting images for use in determining the execution timing of the cleaning process when an image forming job is received is different. Thus, similar components are designated by the same signs, and are not described here.

Figure 11:
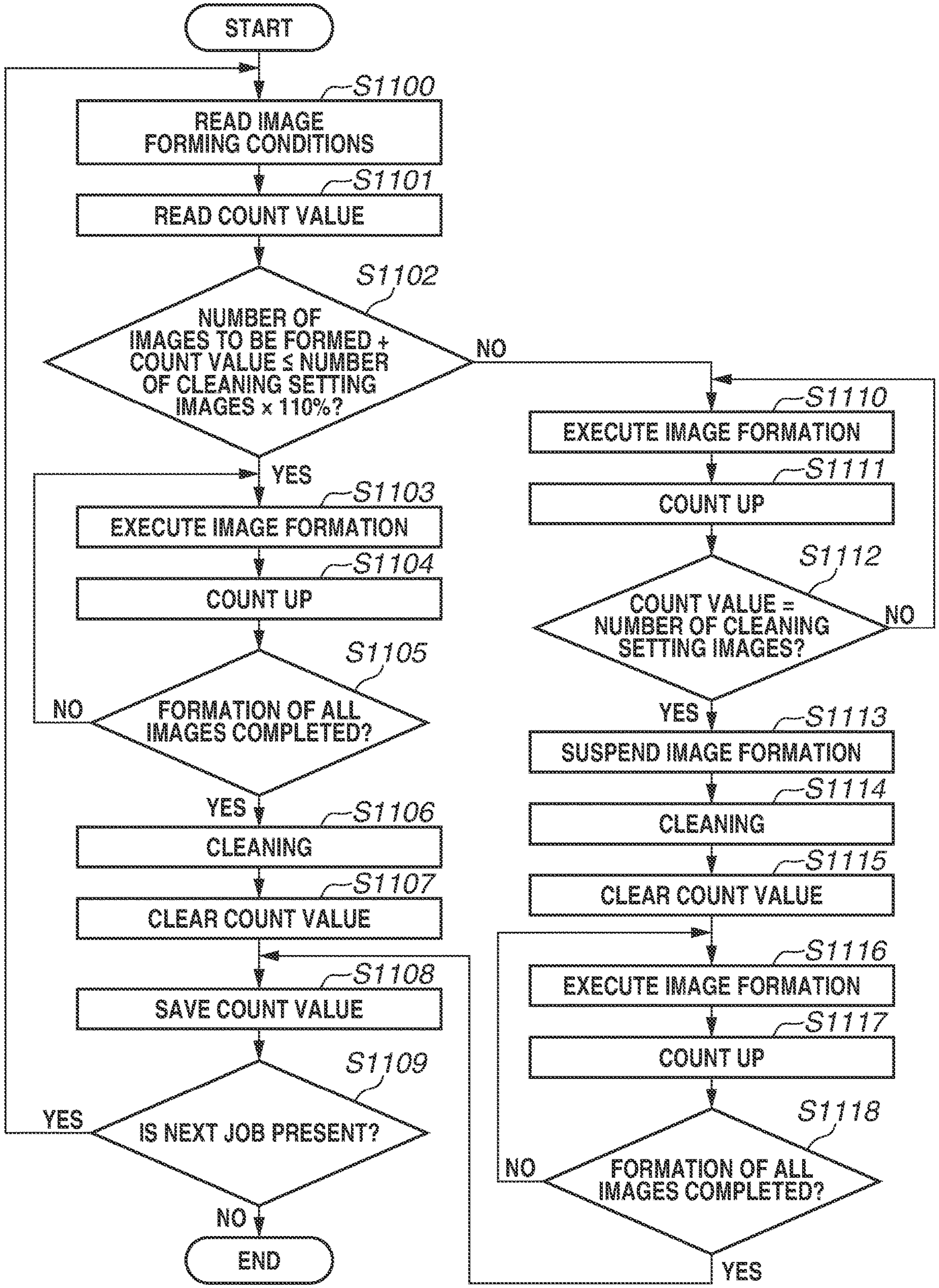
FIG. 11 is a flowchart illustrating a sequence when an image forming job is executed according to a fourth exemplary embodiment.

FIG. 11 is a flowchart illustrating an image forming sequence according to the fourth exemplary embodiment. First, upon receiving an image forming job from the operator through the operation unit 304, then in step S1100, the CPU 601 reads print conditions such as the specified number of images to be formed and one-sided or two-sided printing and saves operation settings for the received image forming job in the RAM 603.

If the number of images to be formed is set according to the operation settings saved in step S1100, then in step S1101, the CPU 601 acquires the count value of the counter 607. Then, in step S1102, the CPU 601 calculates the total value of the number of images to be formed set by the user in step S1100 and the count value read in step S1101 and determines whether the total value is less than or equal to the number of cleaning setting images+10%. At this time, in the present exemplary embodiment, the value of the number of cleaning setting images+10% is a neighborhood value, and the range from the number of cleaning setting images to the number of cleaning setting images×110% is a predetermined range including a predetermined value. That is, in step S1102, the CPU 601 determines whether the total value of the number of images to be formed in the image forming job and the current count value is a value less than or equal to 110% of the number of cleaning setting images. More specifically, in a case where the number of cleaning setting images is 1000, then in step S1102, the CPU 601 determines whether the total value of the number of images to be formed in the image forming job and the current count value is less than or equal to 1100. At this time, the number of cleaning setting images is an example of a first number of cleaning setting images, and the value of the number of cleaning setting images×110% is an example of a second number of cleaning setting images.

If the total value is less than or equal to the number of cleaning setting images+10% (Yes in step S1102), then in step S1103, the CPU 601 executes an image forming operation. After performing an image forming operation on a sheet, then in step S1104, the CPU 601 adds 1 to the count value of the counter 607. Then, in step S1105, the CPU 601 determines whether the formation of all images in the image forming job set by the operator in step S1100 is completed. Then, if the formation of all images is not completed (No in step S1105), the CPU 601 continues executing the image forming job. Then, every time the CPU 601 forms an image on a sheet, the CPU 601 adds 1 to the count value of the counter 607. Further, if the formation of all images is completed (Yes in step S1105), then in step S1106, the CPU 601 outputs a cleaning execution instruction to the cleaning control unit 604 and controls the cleaning mechanism 51 to perform cleaning.

Then, in step S1107, the CPU 601 clears the count value of the counter 607. In step S1108, the CPU 601 saves 0 as the count value in the RAM 603. Then, in step S1109, the CPU 601 determines whether a next image forming job is received. If a next image forming job is received (Yes in step S1109), the processing returns to step S1100. If a next image forming job is not received (No in step S1109), the image forming sequence ends.

Further, if the total value of the number of images to be formed saved in step S1100 and the count value acquired in step S1101 is greater than the number of cleaning setting images+10% (No in step S1102), then in step S1110, the CPU 601 executes an image forming operation. After forming an image on a sheet in step S1110, then in step S1111, the CPU 601 increments the count value of the counter 607 by 1.

Then, in step S1112, the CPU 601 determines whether the count value of the counter 607 counted up in step S1111 has reached the number of cleaning setting images.

The CPU 601 executes an image forming operation until it is determined in step S1112 that the count value is equal to the number of cleaning setting images (No in step S1112). If it is determined in step S1112 that the count value is equal to the number of cleaning setting images (Yes in step S1112), then in step S1113, the CPU 601 suspends the image forming job.

In step S1114, the CPU 601 outputs a cleaning execution instruction to the cleaning control unit 604 and performs the cleaning process. Then, if the cleaning process in step S1114 is completed, then in step S1115, the CPU 601 clears the count value of the counter 607. In step S1116, the CPU 601 resumes the suspended image forming job and executes an image forming operation.

After executing the image forming operation in step S1116, then in step S1117, the CPU 601 increments the count value of the counter 607 by 1. Then, in step S1118, the CPU 601 determines whether the formation of all images in the image forming job set by the operator in step S1100 is completed. If the formation of all images is not completed (No in step S1118), the CPU 601 continues executing the image forming job. Then, every time the CPU 601 forms an image on a single sheet, the CPU 601 adds 1 to the count value of the counter 607. If the formation of all images is completed (Yes in step S1118), then in step S1108, the CPU 601 saves the count value at this time in the RAM 603.

Then, if a next image forming job is received (Yes in step S1109), the processing returns to step S1100. If a next image forming job is not received (No in step S1109), the image forming sequence ends.

As described above, in the present exemplary embodiment, when an image forming job is completed, a cleaning process is performed even when the accumulated number of formed images is greater than the number of cleaning setting images but is the number of images near the number of cleaning setting images. In this way, it is possible to prevent downtime from occurring due to the suspension of the job. Thus, it is possible to suppress a reduction in usability.

Further, if, during the execution of an image forming job, another image forming job that will greatly exceed the number of cleaning setting images is received, the image forming job is suspended due to the cleaning process, but it is possible to prevent a deterioration in image quality due to the existence of a foreign substance on the transmission members 42. Thus, the operator does not need to perform the image forming job again due to a deterioration in image quality. As a result, it is possible to control a reduction in usability.

Other Exemplary Embodiments

In the above exemplary embodiments, a configuration is employed in which the optical scanning device 40 is provided vertically below the image formation units 10. Alternatively, a configuration may be employed in which the optical scanning device 40 is provided vertically above the image formation units 10. In this configuration, since the transmission members 42*a* to 42*d* are provided above the image formation units 10, toner or paper dust does not fall from the image formation units 10. Scattered toner or paper dust, however, may be attached to the transmission members 42*a* to 42*d*. Thus, even in the configuration in which the optical scanning device 40 is provided vertically above the image formation units 10, the cleaning mechanism 51 is provided, whereby it is possible to remove a foreign substance such as toner or paper dust attached to the transmission members 42*a* to 42*d*.

Further, in the above exemplary embodiments, a configuration is employed in which based on number-of-formed-images information from the CPU 601, 1 is added to the count value of the counter 607. Alternatively, a configuration may be employed in which based on number-of-formed-images information, 1 is subtracted from the count value of the counter 607. In this case, a configuration may be employed in which a value is subtracted from the set number of cleaning setting images. The number of cleaning setting images may be set as "−1000". Alternatively, it may be determined whether the count value has reached the number of cleaning setting images based on the absolute value of the count value counted by the counter 607.

Also in such a configuration, even if a count value (the number of formed images) reaches the number of cleaning setting images in the middle of the execution of an image forming job, the image forming job is not suspended. Then, after the image forming job is completed, a cleaning process is performed. Thus, an operator who gives an instruction to execute the image forming job is not kept waiting. Thus, it is possible to prevent a reduction in usability.

Further, in the above exemplary embodiments, a configuration is discussed in which an image forming job is received from the operator via the operation unit 304. Alternatively, the above exemplary embodiments can also be employed in a configuration in which an image forming job is received from an external device via a communication line. As described above, the image forming apparatus 1 can receive an image forming job from the operator, using various methods. Using the above exemplary embodiments, the effect of suppressing a reduction in usability is considered particularly great for an operator who inputs an image forming job via the operation unit 304. This is because there is a high possibility that the operator who inputs an image forming job via the operation unit 304 waits for the completion of the image forming job in front of the main body of the apparatus.

Similarly, there is also a high possibility that an operator who performs an image forming job for copying, with the image formation units 10, a document image read using the reader unit 306 waits for the completion of the job in front of the main body of the apparatus. Thus, the effect of using the above exemplary embodiments is considered particularly great for such an operator. Additionally, also in a configuration in which a user authentication unit (not illustrated) using a short-range wireless communication method is provided in the image forming apparatus 1, the effect of using the above exemplary embodiments is considered particularly great. This is because an operator performs an authentication operation in the user authentication unit to form an image in a transmitted job, and therefore, there is a high possibility that the operator keeps waiting for the completion of the image forming job in front of the apparatus.

As described above, in the above exemplary embodiments, it is possible to prevent the suspension of the job of the operator due to a cleaning operation of the optical scanning device 40 in a case where an operator causes the image forming apparatus 1 to execute an image forming job. Thus, it is possible to suppress a reduction in usability.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-150556, filed Aug. 9, 2018, which is hereby incorporated by reference herein in its entirety.

What is claimed is:

1. An image forming apparatus comprising:

an image forming unit including, a photosensitive member, and an optical scanning device having a transmission member that allows laser light that scans the photosensitive member to pass therethrough to outside the optical scanning device, wherein the image forming unit is configured to develop, using toner, an electrostatic latent image formed on the photosensitive member by being scanned by the laser light and transferring a toner image obtained by developing the electrostatic latent image onto a recording medium, thereby forming an image on the recording medium;

a cleaning mechanism configured to clean the transmission member;

a counter configured to count the number of formed images indicating images formed on recording media by the image forming unit; and a control unit configured to control an operation of the cleaning mechanism, wherein (1) in a case where a total number of a number of images to be formed specified by an input job and a count value of the counter before the counter starts counting a number of images formed based on the job exceeds a second number of images greater than a first number of images, the control unit suspends an image forming operation based on the job and causes the cleaning mechanism to operate when the total number of images is equal to the first number of images, and (2) in a case where the total number is greater than or equal to the first number of images and smaller than or equal to the second number of images, the control unit causes the cleaning mechanism to operate during a period after the image forming operation based on the job is completed and before a next image forming operation is started.

2. The image forming apparatus according to claim 1, wherein (1) in a case where the total number is smaller than a third number of images smaller than the first number of images, the control unit does not cause the cleaning mechanism to operate during the period after the image forming operation based on the job is completed and before the next image forming operation is started, and (2) in a case where the total number is greater than or equal to the third number of images and smaller than or equal to the second number of images, the control unit causes the cleaning mechanism to operate during the period after the image forming operation based on the job is completed and before the next image forming operation is started.

3. The image forming apparatus according to claim 1, wherein, when the control unit causes the cleaning mechanism to operate and cleaning of the transmission member ends, the control unit resets the count value of the counter.

4. The image forming apparatus according to claim 1, further comprising:

a user interface unit configured to receive a setting regarding the image forming apparatus from an operator; and a storage unit configured to store a value set by the operator via the user interface unit as the first number of images, wherein the storage unit stores the first number of images and the second number of images, and the control unit determines whether the total number is greater than or equal to the first number of images and smaller than or equal to the second number of images.

5. The image forming apparatus according to claim 2, further comprising:

a user interface unit configured to receive a setting regarding the image forming apparatus from an operator; and a storage unit configured to store a value set by the operator via the user interface unit as the first number of images, wherein the storage unit stores the first number of images, the second number of images, and the third number of images, and the control unit determines whether the total number is greater than or equal to the third number of images and smaller than or equal to the second number of images.

6. The image forming apparatus according to claim 1, wherein the second number of images is smaller than or equal to the first number of images plus 50.

7. The image forming apparatus according to claim 1, wherein the second number of images is smaller than or equal to 110% of the first number of images.

8. The image forming apparatus according to claim 2, wherein the third number of images is greater than or equal to the first number of images minus 50.

9. The image forming apparatus according to claim 2, wherein the third number of images is greater than or equal to 90% of the first number of images.

10. An image forming apparatus comprising:

an image forming unit including, a photosensitive member, and an optical scanning device having a transmission member that allows laser light that scans the photosensitive member to pass therethrough to outside the optical scanning device, wherein the image forming unit is configured to develop, using toner, an electrostatic latent image formed on the photosensitive member by being scanned by the laser light and transferring a toner image obtained by developing the electrostatic latent image onto a recording medium, thereby forming an image on the recording medium;

a cleaning mechanism configured to clean the transmission member;

a counter configured to count the number of formed images indicating images formed on recording media by the image forming unit; and a control unit configured to control an operation of the cleaning mechanism, wherein (1) in a case where a total number of a number of images to be formed specified by an input job and a count value of the counter before the counter starts counting a number of images formed based on the job is greater than or equal to a second number of images smaller than a first number of images and smaller than or equal to the first number of images, the control unit causes the cleaning mechanism to operate during a period after an image forming operation based on the job is completed and before a next image forming operation is started, and (2) in a case where the total number is smaller than the second number of images, the control unit does not cause the cleaning mechanism to operate during the period after the image forming operation based on the job is completed and before the next image forming operation is started.

11. The image forming apparatus according to claim 10, wherein, when the control unit causes the cleaning mechanism to operate and cleaning of the transmission member ends, the control unit resets the count value of the counter.

12. The image forming apparatus according to claim 10, further comprising:

a user interface unit configured to receive a setting regarding the image forming apparatus from an operator; and a storage unit configured to store a value set by the operator via the user interface unit as the first number of images, wherein the storage unit stores the first number of images and the second number of images, and the control unit determines whether the total number is greater than or equal to the second number of images and smaller than or equal to the first number of images.

13. The image forming apparatus according to claim 10, wherein the second number of images is smaller than or equal to the first number of images minus 50.

14. The image forming apparatus according to claim 10, wherein the second number of images is greater than or equal to 90% of the first number of images.

15. An image forming apparatus comprising:

an image forming unit including, a photosensitive member, and an optical scanning device having a transmission member that allows laser light that scans the photosensitive member to pass therethrough to outside the optical scanning device, wherein the image forming unit is configured to develop, using toner, an electrostatic latent image formed on the photosensitive member by being scanned by the laser light and transferring a toner image obtained by developing the electrostatic latent image onto a recording medium, thereby forming an image on the recording medium;

a cleaning mechanism configured to clean the transmission member;

a counter configured to count the number of pages on which images are formed on recording media by the image forming unit; and a control unit configured to control an operation of the cleaning mechanism, wherein (1) in a case where a total number of a number of pages on which images are to be formed specified by an input job and a count value of the counter before the counter starts counting a number of pages on which images are formed based on the job exceeds a second number of pages greater than a first number of pages, the control unit suspends an image forming operation based on the job and causes the cleaning mechanism to operate when the total number of pages on which images are formed is equal to the first number of pages, and (2) in a case where the total number is greater than or equal to the first number of pages and smaller than or equal to the second number of pages, the control unit causes the cleaning mechanism to operate during a period after the image forming operation based on the job is completed and before a next image forming operation is started.

16. The image forming apparatus according to claim 15, wherein (1) in a case where the total number is smaller than a third number of pages smaller than the first number of pages, the control unit does not cause the cleaning mechanism to operate during the period after the image forming operation based on the job is completed and before the next image forming operation is started, and (2) in a case where the total number is greater than or equal to the third number of pages and smaller than or equal to the second number of pages, the control unit causes the cleaning mechanism to operate during the period after the image forming operation based on the job is completed and before the next image forming operation is started.

17. The image forming apparatus according to claim 15, wherein, when the control unit causes the cleaning mechanism to operate and cleaning of the transmission member ends, the control unit resets the count value of the counter.

18. The image forming apparatus according to claim 15, further comprising:

a user interface unit configured to receive a setting regarding the image forming apparatus from an operator; and a storage unit configured to store a value set by the operator via the user interface unit as the first number of pages, wherein the storage unit stores the first number of pages and the second number of pages, and the control unit determines whether the total number is greater than or equal to the first number of pages and smaller than or equal to the second number of pages.

19. The image forming apparatus according to claim 16, further comprising:

a user interface unit configured to receive a setting regarding the image forming apparatus from an operator; and a storage unit configured to store a value set by the operator via the user interface unit as the first number of pages, wherein the storage unit stores the first number of pages, the second number of pages, and the third number of pages, and the control unit determines whether the total number is greater than or equal to the third number of pages and smaller than or equal to the second number of pages.

20. The image forming apparatus according to claim 15, wherein the second number of pages is smaller than or equal to the first number of pages plus 50.

21. The image forming apparatus according to claim 15, wherein the second number of pages is smaller than or equal to 110% of the first number of pages.

22. The image forming apparatus according to claim 16, wherein the third number of pages is greater than or equal to the first number of pages minus 50.

23. The image forming apparatus according to claim 16, wherein the third number of pages is greater than or equal to 90% of the first number of pages.

24. An image forming apparatus comprising:

an image forming unit including, a photosensitive member, and an optical scanning device having a transmission member that allows laser light that scans the photosensitive member to pass therethrough to outside the optical scanning device, wherein the image forming unit is configured to develop, using toner, an electrostatic latent image formed on the photosensitive member by being scanned by the laser light and transferring a toner image obtained by developing the electrostatic latent image onto a recording medium, thereby forming an image on the recording medium;

a cleaning mechanism configured to clean the transmission member;

a counter configured to count the number of pages on which images are formed by the image forming unit; and a control unit configured to control an operation of the cleaning mechanism, wherein (1) in a case where a total number of a number of pages on which images are to be formed specified by an input job and a count value of the counter before the counter starts counting a number of pages on which images are formed based on the job is greater than or equal to a second number of pages smaller than a first number of pages and smaller than or equal to the first number of pages, the control unit causes the cleaning mechanism to operate during a period after an image forming operation based on the job is completed and before a next image forming operation is started, and (2) in a case where the total number is smaller than the second number of pages, the control unit does not cause the cleaning mechanism to operate during the period after the image forming operation based on the job is completed and before the next image forming operation is started.

25. The image forming apparatus according to claim 24, wherein, when the control unit causes the cleaning mechanism to operate and cleaning of the transmission member ends, the control unit resets the count value of the counter.

26. The image forming apparatus according to claim 24, further comprising:

a user interface unit configured to receive a setting regarding the image forming apparatus from an operator; and a storage unit configured to store a value set by the operator via the user interface unit as the first number of pages, wherein the storage unit stores the first number of pages and the second number of pages, and the control unit determines whether the total number is greater than or equal to the second number of pages and smaller than or equal to the first number of pages.

27. The image forming apparatus according to claim 24, wherein the second number of pages is smaller than or equal to the first number of pages minus 50.

28. The image forming apparatus according to claim 24, wherein the second number of pages is greater than or equal to 90% of the first number of pages.

* * * * *